US011641135B2

(12) United States Patent
Titov et al.

(10) Patent No.: US 11,641,135 B2
(45) Date of Patent: May 2, 2023

(54) TECHNIQUES FOR POWER TRANSFER THROUGH WHEELS OF A PATIENT SUPPORT APPARATUS

(71) Applicant: Stryker Corporation, Kalamazoo, MI (US)

(72) Inventors: Alexey Titov, Redmond, WA (US); Michael Hayes, South Haven, MI (US); Ming Chen, Ann Arbor, MI (US); Jeffrey S. Dunfee, II, Kalamazoo, MI (US)

(73) Assignee: Stryker Corporation, Kalamazoo, MI (US)

(*) Notice: Subject to any disclaimer, the term of this patent is extended or adjusted under 35 U.S.C. 154(b) by 0 days.

(21) Appl. No.: 17/559,090

(22) Filed: Dec. 22, 2021

(65) Prior Publication Data

US 2022/0115914 A1 Apr. 14, 2022

Related U.S. Application Data

(63) Continuation of application No. 17/009,987, filed on Sep. 2, 2020, now Pat. No. 11,245,288, which is a
(Continued)

(51) Int. Cl.
*H02J 50/12* (2016.01)
*A61G 7/05* (2006.01)
(Continued)

(52) U.S. Cl.
CPC .............. *H02J 50/12* (2016.02); *A61G 7/018* (2013.01); *A61G 7/05* (2013.01); *A61G 7/0528* (2016.11);
(Continued)

(58) Field of Classification Search
CPC .. H02J 50/12; H02J 50/50; H02J 50/10; H02J 7/0042; H02J 7/00; A61G 7/0528;
(Continued)

(56) References Cited

U.S. PATENT DOCUMENTS 3,644,945 A 2/1972 Goodman et al.
3,743,905 A 7/1973 Goodman et al.
(Continued)

FOREIGN PATENT DOCUMENTS

AU 2008316723 A1 4/2009
CA 2187727 A1 4/1997
(Continued)

OTHER PUBLICATIONS

Colson Group USA, "EZ Wheel Brochure", 2017, 4 pages.
(Continued)

*Primary Examiner* — Robert L Deberadinis
(74) *Attorney, Agent, or Firm* — Howard & Howard Attorneys PLLC

(57) ABSTRACT

A power transfer system comprises a patient support apparatus and a separate power transfer device. The patient support apparatus comprises a support structure having a base and a patient support surface for a patient and wheels coupled to the support structure to facilitate movement of the patient support apparatus over a floor surface. One or more of the wheels includes a power receiver integrated therewith. The power transfer device is energizeable to interact with the wheel to facilitate power transfer between the power transfer device and the power receiver through the wheel.

14 Claims, 14 Drawing Sheets

Related U.S. Application Data continuation of application No. 16/168,089, filed on Oct. 23, 2018, now Pat. No. 10,797,524.

(60) Provisional application No. 62/576,317, filed on Oct. 24, 2017.

(51) Int. Cl.
*H02J 7/00* (2006.01)
*H02J 50/05* (2016.01)
*A61G 7/018* (2006.01)
*H02J 50/10* (2016.01)

(52) U.S. Cl.
CPC ............ *H02J 7/0042* (2013.01); *H02J 50/05* (2016.02); *H02J 50/10* (2016.02); *A61G 2203/22* (2013.01)

(58) Field of Classification Search
CPC ........ A61G 7/018; A61G 7/05; A61G 7/2203; A61G 7/22
See application file for complete search history.

(56) References Cited

U.S. PATENT DOCUMENTS

| | | | |
|---|---|---|---|
| 3,763,979 A | 10/1973 | Goodman et al. |
| 4,095,822 A | 6/1978 | Thornhill |
| 4,944,056 A | 7/1990 | Schroeder et al. |
| 4,961,422 A | 10/1990 | Marchosky et al. |
| 5,164,623 A | 11/1992 | Shkondin |
| 5,197,466 A | 3/1993 | Marchosky et al. |
| 5,591,217 A | 1/1997 | Barreras |
| 5,697,110 A | 12/1997 | Campbell |
| 5,708,993 A | 1/1998 | Campbell et al. |
| 5,769,877 A | 6/1998 | Barreras, Sr. |
| 5,806,110 A | 9/1998 | Kunz et al. |
| 5,806,111 A | 9/1998 | Heimbrock et al. |
| 5,807,397 A | 9/1998 | Barreras |
| 5,821,728 A | 10/1998 | Schwind |
| 5,991,665 A | 11/1999 | Wang et al. |
| 6,460,828 B1 | 10/2002 | Gersemsky et al. |
| 6,532,607 B1 | 3/2003 | Heil |
| 6,802,385 B2 | 10/2004 | Pyntikov et al. |
| 6,838,174 B2 | 1/2005 | Nakahigashi |
| 6,870,475 B2 | 3/2005 | Fitch et al. |
| 6,871,714 B2 | 3/2005 | Johnson |
| 6,966,083 B1 | 11/2005 | Cheng |
| 7,010,369 B2 | 3/2006 | Borders et al. |
| 7,154,397 B2 | 12/2006 | Zerhusen et al. |
| 7,256,705 B2 | 8/2007 | Kagermeier et al. |
| 7,321,811 B1 | 1/2008 | Rawls-Meehan |
| 7,398,571 B2 | 7/2008 | Souke et al. |
| 7,404,221 B2 | 7/2008 | Sackner |
| 7,465,280 B2 | 12/2008 | Rawls-Meehan |
| 7,528,521 B2 | 5/2009 | Naitou et al. |
| 7,530,616 B2 | 5/2009 | Pomper |
| 7,650,192 B2 | 1/2010 | Wahlstrand |
| 7,679,520 B2 | 3/2010 | Zerhusen et al. |
| 7,725,968 B2 | 6/2010 | Lambarth |
| 7,825,544 B2 | 11/2010 | Jansen et al. |
| 7,868,740 B2 | 1/2011 | McNeely et al. |
| 7,887,113 B2 | 2/2011 | Lambarth et al. |
| 7,911,349 B2 | 3/2011 | Zerhusen et al. |
| 3,000,800 A1 | 8/2011 | Takeda et al. |
| 3,006,332 A1 | 8/2011 | Lemire et al. |
| 8,019,486 B2 | 9/2011 | Rawls-Meehan |
| 8,031,057 B2 | 10/2011 | McNeely et al. |
| 8,032,263 B2 | 10/2011 | Rawls-Meehan |
| 8,035,255 B2 | 10/2011 | Kurs et al. |
| 8,046,115 B2 | 10/2011 | Rawls-Meehan |
| 8,046,116 B2 | 10/2011 | Rawls-Meehan |
| 8,046,117 B2 | 10/2011 | Rawls-Meehan |
| 8,056,163 B2 | 11/2011 | Lemire et al. |
| 8,056,950 B2 | 11/2011 | Souke et al. |
| 8,063,785 B2 | 11/2011 | Sacchetti |
| 8,069,512 B2 | 12/2011 | Rawls-Meehan |
| 8,078,336 B2 | 12/2011 | Rawls-Meehan |
| 8,078,337 B2 | 12/2011 | Rawls-Meehan |
| 8,106,539 B2 | 1/2012 | Schatz et al. |
| 8,121,856 B2 | 2/2012 | Huster et al. |
| 8,125,318 B2 | 2/2012 | Heimbrock et al. |
| 8,129,865 B2 | 3/2012 | Krumme et al. |
| 8,143,846 B2 | 3/2012 | Herman et al. |
| 8,177,274 B2 | 5/2012 | Pomper |
| 8,285,388 B2 | 10/2012 | Wahlstrand |
| 8,295,940 B2 | 10/2012 | Sherman |
| 8,304,935 B2 | 11/2012 | Karalis et al. |
| 8,324,759 B2 | 12/2012 | Karalis et al. |
| 8,334,779 B2 | 12/2012 | Zerhusen et al. |
| 8,344,860 B2 | 1/2013 | Collins, Jr. et al. |
| 8,362,742 B2 | 1/2013 | Kallmyer |
| 8,368,545 B2 | 2/2013 | Zerhusen et al. |
| 8,375,488 B2 | 2/2013 | Rawls-Meehan |
| 8,400,017 B2 | 3/2013 | Kurs et al. |
| 8,400,104 B2 | 3/2013 | Adamczyk et al. |
| 8,410,636 B2 | 4/2013 | Kurs et al. |
| 8,439,416 B2 | 5/2013 | Lambarth et al. |
| 8,441,154 B2 | 5/2013 | Karalis et al. |
| 8,447,366 B2 | 5/2013 | Ungari et al. |
| 8,461,719 B2 | 6/2013 | Kesler et al. |
| 8,461,720 B2 | 6/2013 | Kurs et al. |
| 8,461,721 B2 | 6/2013 | Karalis et al. |
| 8,461,722 B2 | 6/2013 | Kurs et al. |
| 8,466,583 B2 | 6/2013 | Karalis et al. |
| 8,471,410 B2 | 6/2013 | Karalis et al. |
| 8,476,788 B2 | 7/2013 | Karalis et al. |
| 8,482,158 B2 | 7/2013 | Kurs et al. |
| 8,487,480 B1 | 7/2013 | Kesler et al. |
| 8,497,601 B2 | 7/2013 | Hall et al. |
| 8,499,384 B2 | 8/2013 | Zerhusen |
| 8,536,990 B2 | 9/2013 | Collins, Jr. et al. |
| 8,551,163 B2 | 10/2013 | Aber et al. |
| 8,554,322 B2 | 10/2013 | Olson et al. |
| 8,565,934 B2 | 10/2013 | Rawls-Meehan |
| 8,569,914 B2 | 10/2013 | Karalis et al. |
| 8,587,153 B2 | 11/2013 | Schatz et al. |
| 8,587,155 B2 | 11/2013 | Giler et al. |
| 8,604,916 B2 | 12/2013 | McNeely et al. |
| 8,604,917 B2 | 12/2013 | Collins et al. |
| 8,606,344 B2 | 12/2013 | DiMaio et al. |
| 8,618,696 B2 | 12/2013 | Kurs et al. |
| 8,626,249 B2 | 1/2014 | Ungari et al. |
| 8,629,578 B2 | 1/2014 | Kurs et al. |
| 8,634,981 B1 | 1/2014 | Hyde et al. |
| 8,641,629 B2 | 2/2014 | Kurokawa |
| 8,669,676 B2 | 3/2014 | Karalis et al. |
| 8,674,839 B2 | 3/2014 | Zerhusen et al. |
| 8,686,598 B2 | 4/2014 | Schatz et al. |
| 8,692,410 B2 | 4/2014 | Schatz et al. |
| 8,716,903 B2 | 5/2014 | Kurs et al. |
| 8,723,366 B2 | 5/2014 | Fiorello et al. |
| 8,725,262 B2 | 5/2014 | Olson et al. |
| 8,729,737 B2 | 5/2014 | Schatz et al. |
| 8,764,621 B2 | 7/2014 | Badstibner et al. |
| 8,772,973 B2 | 7/2014 | Kurs |
| 8,782,826 B2 | 7/2014 | White et al. |
| 8,799,011 B2 | 8/2014 | Wilson et al. |
| 8,847,548 B2 | 9/2014 | Kesler et al. |
| 8,862,241 B2 | 10/2014 | Forsell |
| 8,864,205 B2 | 10/2014 | Lemire et al. |
| 8,866,598 B2 | 10/2014 | Collins, Jr. et al. |
| 8,869,328 B2 | 10/2014 | Rawls-Meehan |
| 8,886,333 B2 | 11/2014 | Lui et al. |
| 8,886,383 B2 | 11/2014 | Hyde et al. |
| 8,887,619 B2 | 11/2014 | Kallmyer et al. |
| 8,890,470 B2 | 11/2014 | Partovi |
| 8,896,264 B2 | 11/2014 | Partovi |
| 8,901,778 B2 | 12/2014 | Kesler et al. |
| 8,901,779 B2 | 12/2014 | Kesler et al. |
| 8,901,881 B2 | 12/2014 | Partovi |
| 8,907,531 B2 | 12/2014 | Hall et al. |
| 8,909,378 B2 | 12/2014 | Rawls-Meehan |
| 8,912,687 B2 | 12/2014 | Kesler et al. |

(56) References Cited

U.S. PATENT DOCUMENTS

| | | |
|---|---|---|
| 8,917,166 B2 | 12/2014 | Collins, Jr. et al. |
| 8,928,276 B2 | 1/2015 | Kesler et al. |
| 8,933,594 B2 | 1/2015 | Kurs et al. |
| 8,937,408 B2 | 1/2015 | Ganem et al. |
| 8,946,938 B2 | 2/2015 | Kesler et al. |
| 8,963,488 B2 | 2/2015 | Campanella et al. |
| 8,973,963 B2 | 3/2015 | Lambarth et al. |
| 8,984,685 B2 | 3/2015 | Robertson et al. |
| 9,002,469 B2 | 4/2015 | D'Ambrosio |
| 9,038,218 B1 | 5/2015 | Heil et al. |
| 9,044,365 B2 | 6/2015 | Rawls-Meehan |
| 9,044,366 B2 | 6/2015 | Rawls-Meehan |
| 9,050,031 B2 | 6/2015 | Collins, Jr. et al. |
| 9,052,718 B2 | 6/2015 | Hyde et al. |
| 9,059,599 B2 | 6/2015 | Won et al. |
| 9,079,043 B2 | 7/2015 | Stark et al. |
| 9,089,462 B1 | 7/2015 | Lafleche |
| 9,093,853 B2 | 7/2015 | Schatz et al. |
| 9,101,521 B2 | 8/2015 | White et al. |
| 9,105,959 B2 | 8/2015 | Kesler et al. |
| 9,106,203 B2 | 8/2015 | Kesler et al. |
| 9,107,783 B2 | 8/2015 | Childs et al. |
| 9,108,063 B2 | 8/2015 | Olson et al. |
| 9,114,050 B2 | 8/2015 | White et al. |
| 9,125,779 B2 | 9/2015 | Hyde et al. |
| 9,132,051 B2 | 9/2015 | Heil |
| 9,149,126 B2 | 10/2015 | Rawls-Meehan |
| 9,160,203 B2 | 10/2015 | Fiorello et al. |
| 9,161,633 B2 | 10/2015 | Rawls-Meehan |
| 9,173,793 B2 | 11/2015 | Rawls-Meehan |
| 9,173,794 B2 | 11/2015 | Rawls-Meehan |
| 9,182,750 B2 | 11/2015 | Rawls-Meehan |
| 9,184,595 B2 | 11/2015 | Kurs et al. |
| 9,218,454 B2 | 12/2015 | Kiani et al. |
| 9,220,651 B2 | 12/2015 | Hyde et al. |
| 9,233,039 B2 | 1/2016 | Hyde et al. |
| 9,237,814 B2 | 1/2016 | Rawls-Meehan |
| 9,241,858 B2 | 1/2016 | Hyde et al. |
| 9,246,336 B2 | 1/2016 | Kurs et al. |
| 9,259,369 B2 | 2/2016 | Derenne et al. |
| 9,270,134 B2 | 2/2016 | Gaddam et al. |
| 9,278,036 B2 | 3/2016 | Lee |
| 9,281,701 B2 | 3/2016 | Large et al. |
| 9,286,441 B2 | 3/2016 | Zerhusen et al. |
| 9,289,336 B2 | 3/2016 | Lambarth et al. |
| 9,295,849 B2 | 3/2016 | Elghazzawi et al. |
| 9,306,322 B2 | 4/2016 | Bhimavarapu et al. |
| 9,308,303 B2 | 4/2016 | Badstibner et al. |
| 9,314,105 B2 | 4/2016 | Ralws-Meehan |
| 9,314,928 B2 | 4/2016 | Hyde et al. |
| 9,314,929 B2 | 4/2016 | Hyde et al. |
| 9,333,136 B2 | 5/2016 | Gibson et al. |
| 9,336,672 B2 | 5/2016 | Collins, Jr. et al. |
| 9,364,625 B2 | 6/2016 | Silver et al. |
| 9,369,182 B2 | 6/2016 | Kurs et al. |
| 9,375,374 B2 | 6/2016 | Herman et al. |
| 9,381,125 B2 | 7/2016 | Herbst et al. |
| 9,392,875 B2 | 7/2016 | Weyl |
| 9,397,518 B1 | 7/2016 | Theobald |
| 9,407,110 B2 | 8/2016 | Lui et al. |
| 9,425,640 B2 | 8/2016 | Moran |
| 9,427,367 B2 | 8/2016 | White et al. |
| 9,433,546 B2 | 9/2016 | Rawls-Meehan et al. |
| 9,444,520 B2 | 9/2016 | Hall et al. |
| 9,451,833 B2 | 9/2016 | Rawls-Meehan |
| 9,456,939 B2 | 10/2016 | Lambarth et al. |
| 9,463,126 B2 | 10/2016 | Zerhusen et al. |
| 9,463,324 B2 | 10/2016 | Olson et al. |
| 9,465,915 B2 | 10/2016 | McNeely et al. |
| 9,492,339 B2 | 11/2016 | Leib |
| 9,496,719 B2 | 11/2016 | Kesler et al. |
| 9,513,899 B2 | 12/2016 | Collins, Jr. et al. |
| 9,515,494 B2 | 12/2016 | Kurs et al. |
| 9,515,495 B2 | 12/2016 | Kurs et al. |
| 9,517,034 B2 | 12/2016 | Collins, Jr. et al. |
| 9,526,346 B2 | 12/2016 | Rawls-Meehan |
| 9,526,665 B2 | 12/2016 | Rawls-Meehan et al. |
| 9,527,699 B2 | 12/2016 | Liljedahl |
| 9,537,344 B2 | 1/2017 | Thompson et al. |
| 9,560,787 B2 | 1/2017 | Kallmyer et al. |
| 9,577,436 B2 | 2/2017 | Kesler et al. |
| 9,584,189 B2 | 2/2017 | Kurs et al. |
| 9,596,005 B2 | 3/2017 | Kurs et al. |
| 9,601,261 B2 | 3/2017 | Schatz et al. |
| 9,601,270 B2 | 3/2017 | Kurs et al. |
| 9,615,983 B2 | 4/2017 | Stryker et al. |
| 9,734,293 B2 | 8/2017 | Collins, Jr. et al. |
| 9,768,645 B2 | 9/2017 | Tetu et al. |
| 10,004,651 B2 | 6/2018 | DeLuca et al. |
| 10,797,524 B2 | 10/2020 | Titov et al. |
| 2003/0079923 A1 | 5/2003 | Johnson |
| 2004/0083394 A1 | 4/2004 | Brebner et al. |
| 2005/0155149 A1 | 7/2005 | Pedersen |
| 2006/0059623 A1 | 3/2006 | Karmer et al. |
| 2006/0108977 A1 | 5/2006 | Kagermeier et al. |
| 2006/0249320 A1 | 11/2006 | Carter et al. |
| 2007/0211866 A1 | 9/2007 | Sink |
| 2007/0219950 A1 | 9/2007 | Crawford |
| 2007/0299473 A1 | 12/2007 | Matos |
| 2008/0041282 A1 | 2/2008 | Goschy et al. |
| 2008/0086817 A1 | 4/2008 | Zucker et al. |
| 2008/0295595 A1 | 12/2008 | Tacklind et al. |
| 2009/0121660 A1 | 5/2009 | Rawls-Meehan |
| 2010/0045146 A1 | 2/2010 | Thorne |
| 2010/0277121 A1 | 11/2010 | Hall et al. |
| 2010/0314946 A1 | 12/2010 | Budde et al. |
| 2010/0328044 A1 | 12/2010 | Wallenschmidt et al. |
| 2011/0011878 A1 | 1/2011 | Baer et al. |
| 2011/0043049 A1 | 2/2011 | Karalis et al. |
| 2011/0117529 A1 | 5/2011 | Barash et al. |
| 2011/0162067 A1 | 6/2011 | Shuart et al. |
| 2011/0208074 A1 | 8/2011 | Anderson |
| 2011/0247134 A1 | 10/2011 | Howell et al. |
| 2011/0247137 A1 | 10/2011 | Herman et al. |
| 2011/0278948 A1 | 11/2011 | Forsell |
| 2011/0298420 A1 | 12/2011 | Forsberg et al. |
| 2012/0056729 A1 | 3/2012 | Rawls-Meehan |
| 2012/0057685 A1 | 3/2012 | Rawls-Meehan |
| 2012/0069961 A1 | 3/2012 | Pomper et al. |
| 2012/0084920 A1 | 4/2012 | Zucker et al. |
| 2012/0086284 A1 | 4/2012 | Capanella et al. |
| 2012/0091794 A1 | 4/2012 | Campanella et al. |
| 2012/0091796 A1 | 4/2012 | Kesler et al. |
| 2012/0091797 A1 | 4/2012 | Kesler et al. |
| 2012/0091819 A1 | 4/2012 | Kulikowski et al. |
| 2012/0091820 A1 | 4/2012 | Campanella et al. |
| 2012/0091949 A1 | 4/2012 | Campanella et al. |
| 2012/0110738 A1 | 5/2012 | Rawls-Meehan |
| 2012/0110824 A1 | 5/2012 | Smith et al. |
| 2012/0112536 A1 | 5/2012 | Karalis et al. |
| 2012/0112538 A1 | 5/2012 | Kesler et al. |
| 2012/0112691 A1 | 5/2012 | Kurs et al. |
| 2012/0117730 A1 | 5/2012 | Lemire et al. |
| 2012/0119569 A1 | 5/2012 | Karalis et al. |
| 2012/0119698 A1 | 5/2012 | Karalis et al. |
| 2012/0123242 A1 | 5/2012 | Stilley et al. |
| 2012/0139355 A1 | 6/2012 | Ganem et al. |
| 2012/0228952 A1 | 9/2012 | Hall et al. |
| 2012/0235501 A1 | 9/2012 | Kesler et al. |
| 2012/0235502 A1 | 9/2012 | Kesler et al. |
| 2012/0235504 A1 | 9/2012 | Kesler et al. |
| 2012/0235566 A1 | 9/2012 | Karalis et al. |
| 2012/0242159 A1 | 9/2012 | Lou et al. |
| 2012/0248886 A1 | 10/2012 | Kesler et al. |
| 2012/0248887 A1 | 10/2012 | Kesler et al. |
| 2012/0248888 A1 | 10/2012 | Kesler et al. |
| 2012/0248981 A1 | 10/2012 | Karalis et al. |
| 2012/0312196 A1 | 12/2012 | Newkirk |
| 2013/0106347 A1 | 5/2013 | Kallmyer et al. |
| 2013/0109973 A1 | 5/2013 | Kurokawa |
| 2013/0191992 A1 | 8/2013 | Rawls-Meehan |
| 2014/0004814 A1 | 1/2014 | Elghazzawi |
| 2014/0031883 A1 | 1/2014 | Elghazzawi |
| 2014/0039351 A1 | 2/2014 | Mix et al. |

(56) References Cited

U.S. PATENT DOCUMENTS

| | | |
|---|---|---|
| 2014/0045367 A1 | 2/2014 | Christie et al. |
| 2014/0057235 A1 | 2/2014 | Kellum et al. |
| 2014/0090173 A1 | 4/2014 | DiMaio et al. |
| 2014/0139405 A1 | 5/2014 | Ribble et al. |
| 2014/0145915 A1 | 5/2014 | Ribble et al. |
| 2014/0195057 A1 | 7/2014 | Zerhusen et al. |
| 2014/0259414 A1 | 9/2014 | Hayes et al. |
| 2014/0285016 A1 | 9/2014 | Tetu et al. |
| 2014/0312706 A1 | 10/2014 | Fiorello et al. |
| 2014/0312707 A1 | 10/2014 | Fiorello et al. |
| 2014/0327320 A1 | 11/2014 | Muhs et al. |
| 2014/0343968 A1 | 11/2014 | Wilson et al. |
| 2015/0069831 A1 | 3/2015 | Kesler et al. |
| 2015/0075575 A1 | 3/2015 | Karlovich |
| 2015/0088129 A1 | 3/2015 | Ganem et al. |
| 2015/0107020 A1 | 4/2015 | Andersson et al. |
| 2015/0115638 A1 | 4/2015 | Lambarth et al. |
| 2015/0123484 A1 | 5/2015 | Kurs et al. |
| 2015/0128353 A1 | 5/2015 | Kildey |
| 2015/0128354 A1 | 5/2015 | Greenstein et al. |
| 2015/0130412 A1 | 5/2015 | Partovi |
| 2015/0130586 A1 | 5/2015 | Rawls-Meehan |
| 2015/0135436 A1 | 5/2015 | Stryker et al. |
| 2015/0207351 A1 | 7/2015 | Hamburgen et al. |
| 2015/0216749 A1 | 8/2015 | Heil et al. |
| 2015/0251322 A1 | 9/2015 | Goodwin et al. |
| 2015/0252940 A1 | 9/2015 | Goodwin et al. |
| 2015/0255994 A1 | 9/2015 | Kesler et al. |
| 2015/0290061 A1 | 10/2015 | Stafford et al. |
| 2015/0296550 A1 | 10/2015 | Shelly et al. |
| 2015/0297427 A1 | 10/2015 | Lambarth et al. |
| 2015/0297439 A1 | 10/2015 | Karlovich |
| 2015/0335506 A9 | 11/2015 | Kildey |
| 2015/0342806 A1 | 12/2015 | Hyde et al. |
| 2015/0351981 A1 | 12/2015 | Sazonov |
| 2015/0351982 A1 | 12/2015 | Krenik |
| 2015/0357831 A1 | 12/2015 | Fiorello et al. |
| 2015/0362333 A1 | 12/2015 | Miller et al. |
| 2015/0365138 A1 | 12/2015 | Miller et al. |
| 2016/0000622 A1 | 1/2016 | Rawls-Meehan |
| 2016/0013837 A1 | 1/2016 | Howell et al. |
| 2016/0022218 A1 | 1/2016 | Hayes et al. |
| 2016/0028243 A1 | 1/2016 | Schatz et al. |
| 2016/0043571 A1 | 2/2016 | Kesler et al. |
| 2016/0052129 A1 | 2/2016 | Ekas |
| 2016/0052137 A1 | 2/2016 | Hyde et al. |
| 2016/0052138 A1 | 2/2016 | Hyde et al. |
| 2016/0052139 A1 | 2/2016 | Hyde et al. |
| 2016/0067396 A1 | 3/2016 | Stark et al. |
| 2016/0070267 A1 | 3/2016 | Hyde et al. |
| 2016/0075177 A1 | 3/2016 | Biderman et al. |
| 2016/0089283 A1 | 3/2016 | DeLuca et al. |
| 2016/0117450 A1 | 4/2016 | Zerhusen et al. |
| 2016/0120722 A1 | 5/2016 | Mueller |
| 2016/0120740 A1 | 5/2016 | Rawls-Meehan |
| 2016/0128468 A1 | 5/2016 | Lafleche et al. |
| 2016/0136018 A1 | 5/2016 | DeLuca et al. |
| 2016/0149425 A1 | 5/2016 | Hsu |
| 2016/0158082 A1 | 6/2016 | Gainor et al. |
| 2016/0158083 A1 | 6/2016 | Lambarth et al. |
| 2016/0175602 A1 | 6/2016 | Aoyama et al. |
| 2016/0193397 A9 | 7/2016 | Aber et al. |
| 2016/0199983 A1 | 7/2016 | Hyde et al. |
| 2016/0211695 A1 | 7/2016 | Singer |
| 2016/0213537 A1 | 7/2016 | Hayes et al. |
| 2016/0242558 A1 | 8/2016 | Rawls-Meehan et al. |
| 2016/0242681 A1 | 8/2016 | Shen et al. |
| 2016/0256080 A1 | 9/2016 | Shen et al. |
| 2016/0275776 A1 | 9/2016 | Shen et al. |
| 2016/0301253 A1 | 10/2016 | Kurs et al. |
| 2016/0306762 A1 | 10/2016 | Lee et al. |
| 2016/0330402 A1 | 11/2016 | Benetti et al. |
| 2016/0336812 A1 | 11/2016 | Fiorello et al. |
| 2016/0338891 A1 | 11/2016 | Agdeppa et al. |
| 2016/0362015 A1 | 12/2016 | Fiorello et al. |
| 2016/0367415 A1 | 12/2016 | Hayes et al. |
| 2016/0367420 A1 | 12/2016 | Zerhusen et al. |
| 2016/0374884 A1 | 12/2016 | Blickensderfer et al. |
| 2017/0011181 A1 | 1/2017 | McNeely et al. |
| 2017/0020440 A1 | 1/2017 | Flitsch et al. |
| 2017/0027789 A1 | 2/2017 | St.John et al. |
| 2017/0035295 A1 | 2/2017 | Collins, Jr. et al. |
| 2017/0035370 A1 | 2/2017 | Collins, Jr. et al. |
| 2017/0047762 A1 | 2/2017 | Tuseth et al. |
| 2017/0053736 A9 | 2/2017 | Hall et al. |
| 2017/0053737 A1 | 2/2017 | Kurs |
| 2017/0054319 A1 | 2/2017 | Kesler et al. |
| 2017/0055882 A1 | 3/2017 | Al-Ali et al. |
| 2017/0055887 A1 | 3/2017 | Al-Ali |
| 2017/0062124 A9 | 3/2017 | Hall et al. |
| 2017/0063143 A1 | 3/2017 | Hoarau et al. |
| 2017/0065766 A1 | 3/2017 | Olson et al. |
| 2017/0098044 A1 | 4/2017 | Lai et al. |
| 2017/0119607 A1 | 5/2017 | Derenne et al. |
| 2017/0281440 A1 | 10/2017 | Puvogel et al. |
| 2019/0123587 A1 | 4/2019 | Titov et al. |
| 2020/0403450 A1 | 12/2020 | Titov |

FOREIGN PATENT DOCUMENTS

| | | |
|---|---|---|
| CN | 104097531 A | 10/2014 |
| EP | 0315210 B1 | 7/1994 |
| EP | 0700574 B1 | 7/1997 |
| WO | 8903665 A1 | 5/1989 |
| WO | 9100054 A1 | 1/1991 |
| WO | 9428560 A1 | 12/1994 |
| WO | 9620754 A1 | 7/1996 |
| WO | 2004038890 A1 | 5/2004 |
| WO | 2005016216 A2 | 2/2005 |
| WO | 2005077102 A2 | 8/2005 |
| WO | 2007063500 A2 | 6/2007 |
| WO | 2007064609 A1 | 6/2007 |
| WO | 2007118221 A2 | 10/2007 |
| WO | 2007136733 A2 | 11/2007 |
| WO | 2008003027 A2 | 1/2008 |
| WO | 2008036087 A1 | 3/2008 |
| WO | 2008050260 A1 | 5/2008 |
| WO | 2008050292 A2 | 5/2008 |
| WO | 2008055664 A2 | 5/2008 |
| WO | 2008150448 A1 | 12/2008 |
| WO | 2009009296 A3 | 3/2009 |
| WO | 2009055203 A1 | 4/2009 |
| WO | 2009055432 A2 | 4/2009 |
| WO | 2009120970 A2 | 10/2009 |
| WO | 2009123780 A1 | 10/2009 |
| WO | 2009135081 A2 | 11/2009 |
| WO | 2010027282 A2 | 3/2010 |
| WO | 2010036980 A1 | 4/2010 |
| WO | 2010059096 A1 | 5/2010 |
| WO | 2010059097 A1 | 5/2010 |
| WO | 2010093997 A1 | 8/2010 |
| WO | 2011096111 A1 | 8/2011 |
| WO | 2011113070 A1 | 9/2011 |
| WO | 2011156768 A2 | 12/2011 |
| WO | 2012087807 A2 | 6/2012 |
| WO | 2012100219 A1 | 7/2012 |
| WO | 2012122002 A1 | 9/2012 |
| WO | 2012135118 A1 | 10/2012 |
| WO | 2012170278 A2 | 12/2012 |
| WO | 2013006845 A2 | 1/2013 |
| WO | 2013009881 A2 | 1/2013 |
| WO | 2013049979 A1 | 4/2013 |
| WO | 2013050699 A1 | 4/2013 |
| WO | 2013044165 A3 | 5/2013 |
| WO | 2013062808 A1 | 5/2013 |
| WO | 2013062809 A2 | 5/2013 |
| WO | 2013072306 A1 | 5/2013 |
| WO | 2013074452 A2 | 5/2013 |
| WO | 2013078092 A1 | 5/2013 |
| WO | 2013112782 A2 | 8/2013 |
| WO | 2013123119 A1 | 8/2013 |
| WO | 2013131078 A1 | 9/2013 |
| WO | 2013142840 A1 | 9/2013 |
| WO | 2013156907 A2 | 10/2013 |

(56) References Cited

FOREIGN PATENT DOCUMENTS

| | | | |
|---|---|---|---|
| WO | 2013158675 | A1 | 10/2013 |
| WO | 2014014581 | A2 | 1/2014 |
| WO | 2014043659 | A1 | 3/2014 |
| WO | 2014046844 | A1 | 3/2014 |
| WO | 2014052147 | A2 | 4/2014 |
| WO | 2014052148 | A2 | 4/2014 |
| WO | 2014078667 | A1 | 5/2014 |
| WO | 2014097055 | A1 | 6/2014 |
| WO | 2014113164 | A1 | 7/2014 |
| WO | 2014150970 | A1 | 9/2014 |
| WO | 2014151577 | A1 | 9/2014 |
| WO | 2014164248 | A1 | 10/2014 |
| WO | 2015010702 | A1 | 1/2015 |
| WO | 2015106239 | A1 | 7/2015 |
| WO | 2015108653 | A1 | 7/2015 |
| WO | 2015148578 | A2 | 10/2015 |
| WO | 2015191819 | A1 | 12/2015 |
| WO | 2016090384 | A2 | 6/2016 |
| WO | 2016167594 | A1 | 10/2016 |
| WO | 2016179562 | A1 | 11/2016 |
| WO | 2017025735 | A1 | 2/2017 |
| WO | 2017040317 | A1 | 3/2017 |

OTHER PUBLICATIONS

Daily Mail Reporter, "Move over Fred Flintstone: The human-powered car that can reach speeds of up to 60mph", http://www.dailymail.co.uk/motoring/article-1304120/The-human-powered-car-reach-speeds-60mph.html, Aug. 19, 2010, 5 Pages.

English language abstract and machine-assisted English translation for CN 104097531 extracted from espacenet.com database on Jan. 10, 2019, 6 pages.

English language abstract and machine-assisted English translation for WO 2013/072306 extracted from espacenet.com database on Jan. 10, 2019, 14 pages.

English language abstract and machine-assisted English translation for WO 91/00054 extracted from espacenet.com database on Jan. 14, 2019, 11 pages.

English language abstract for WO 2008/055664 extracted from espacenet.com database on Jan. 14, 2019, 2 pages.

English language abstract for WO 2011/096111 and machine-assisted English translation for CN 102812617, an equivalent of WO 2011/096111, extracted from espacenet.com database on Jan. 10, 2019, 22 pages.

English language abstract for WO 2013/049979 extracted from espacenet.com database on Jan. 10, 2019, 1 page.

English language abstract for WO 2013/050699 extracted from espacenet.com database on Jan. 14, 2019, 1 page.

English language abstract not found for AU 2008316723; however, see English language equivalent U.S. Pat. No. 9,734,293. Original document extracted from espacenet.com databasse on Jan. 10, 2019, 1 page.

EZ-Wheel, "La Premiere Roue Electrique Autonome—Integrant Moteur and Batteries Brochure", http://www.ez-wheel.com, 2017, 8 pages.

Stryker SA, "Prime TC Transport Chair Brochure", 2013, 8 pages.

U.S. Appl. No. 16/168,089, filed Oct. 23, 2018.

Youtube "Tesla Charging Snake Video", Aug. 6, 2015, https://www.youtube.com/watch?v=ut3sELMOyTM, 3 pages.

TECHNIQUES FOR POWER TRANSFER THROUGH WHEELS OF A PATIENT SUPPORT APPARATUS

CROSS-REFERENCE TO RELATED APPLICATIONS

This application is a Continuation of U.S. patent application Ser. No. 17/009,987, filed on Sep. 2, 2020, which is a Continuation of U.S. patent application Ser. No. 16/168,089, filed on Oct. 23, 2018 and now granted as U.S. Pat. No. 10,797,524, which claims the benefit of and priority to U.S. Provisional Patent Application No. 62/576,317 filed on Oct. 24, 2017, the disclosures of each of which are hereby incorporated by reference in their entirety.

BACKGROUND

Patient support apparatuses such as hospital beds, stretchers, cots, wheelchairs, and chairs are routinely used by operators to move patients from one location to another. Conventional patient support apparatuses comprise a base and a patient support surface upon which the patient is supported. Wheels are coupled to the base to enable transport over floor surfaces.

A significant number of patient support apparatuses are not powered. However, there is increasing demand to provide patient support apparatuses with energy-consuming devices, such as motors, sensors, and electronics. Conventionally, such energy is provided either by a primary (non-rechargeable) battery or a rechargeable battery. Primary batteries require frequent replacement and add weight and cost to the patient support apparatuses. Rechargeable batteries require personnel to plug the patient support apparatus to an external electrical outlet (or station) for charging, thereby reducing availability for usage of the patient support apparatus and inconveniently requiring the patient support apparatus to include an electrical power cord, which may be burdensome to manage. Thus, conventional energy systems for patient support apparatuses are undesirable for at least these reasons.

A patient support apparatus with features designed to overcome one or more of the aforementioned challenges is desired.

DETAILED DESCRIPTION

I. Patient Support Apparatus Overview

Figure 1:
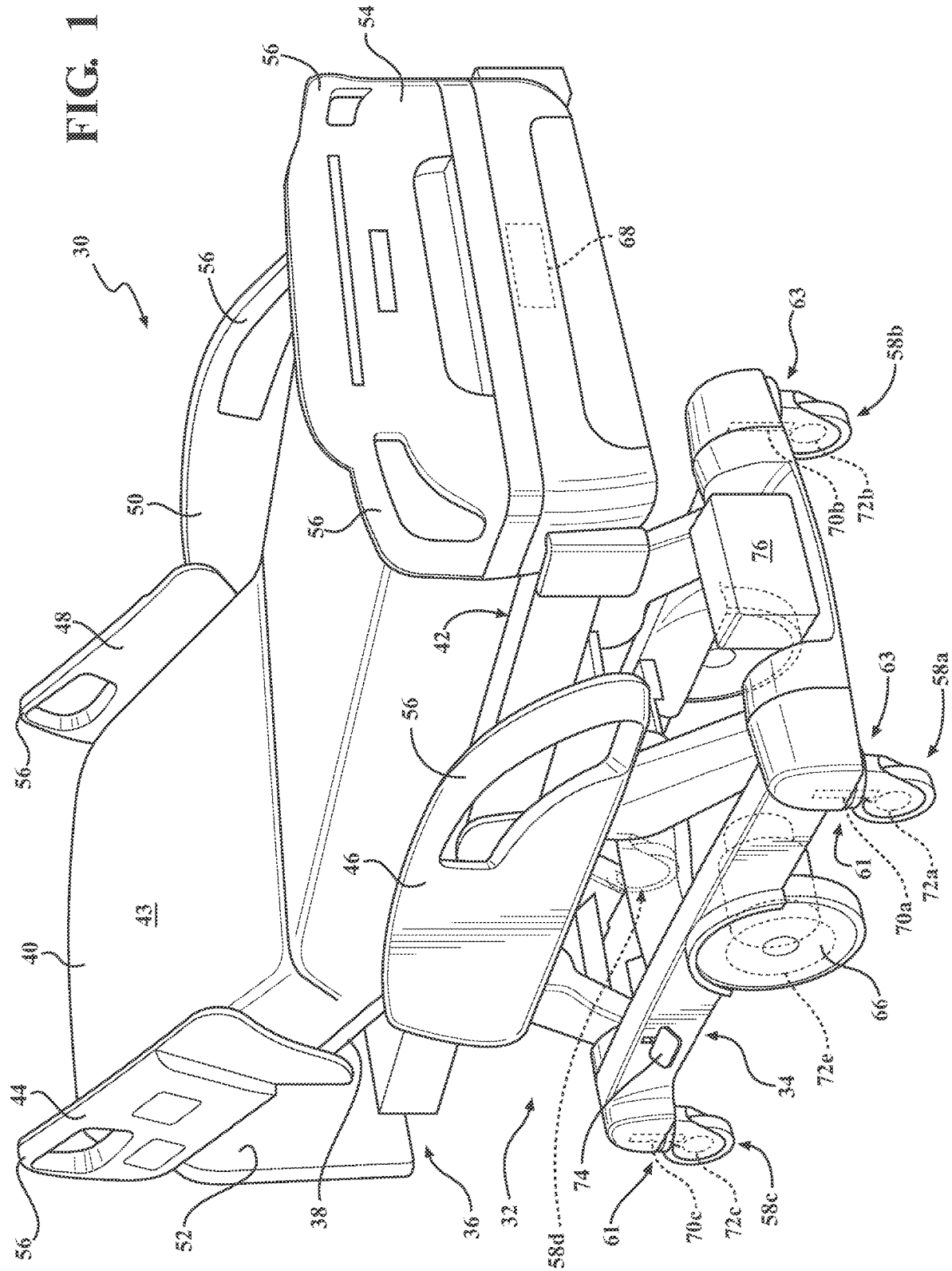
FIG. 1 is perspective view of a patient support apparatus according to one example.

Referring to FIG. 1, a patient support apparatus 30 is shown for moving a patient from one location to another.

The patient support apparatus 30 illustrated in FIG. 1 is a hospital bed. In other embodiments, however, the patient support apparatus 30 may be a stretcher, cot, wheelchair, chair, or similar apparatus.

A support structure 32 provides support for the patient during movement of the patient support apparatus 30. The support structure 32 illustrated in FIG. 1 comprises a base 34 and an intermediate frame 36. The intermediate frame 36 is spaced above the base 34. The support structure 32 also comprises a patient support deck 38 disposed on the intermediate frame 36. The patient support deck 38 may comprise several sections, some of which are pivotable relative to the intermediate frame 36, such as a head section, a seat section, a thigh section, and a foot section. The patient support deck 38 provides a patient support surface 42 upon which the patient is supported. The patient support surface 42 is supported by the base 34.

A mattress 40 is disposed on the patient support deck 38. The mattress 40 comprises a direct patient support surface 43 upon which the patient is supported. The base 34, intermediate frame 36, patient support deck 38, and patient support surfaces 42, 43 each have a head end and a foot end corresponding to the designated placement of the patient's head and feet on the patient support apparatus 30. The construction of the support structure 32 may take on any suitable design, and is not limited to that specifically set forth above or shown in FIG. 1.

Side rails 44, 46, 48, 50 are coupled to the intermediate frame 36. A first side rail 44 is positioned at a right head end of the intermediate frame 36. A second side rail 46 is positioned at a right foot end of the intermediate frame 36. A third side rail 48 is positioned at a left head end of the intermediate frame 36. A fourth side rail 50 is positioned at a left foot end of the intermediate frame 36. If the patient support apparatus 30 is a stretcher or a cot, there may be fewer side rails. The side rails 44, 46, 48, 50 are movable between a raised position in which they block ingress and egress into and out of the patient support apparatus 30, one or more intermediate positions, and a lowered position in which they are not an obstacle to enable such ingress and egress. In still other configurations, the patient support apparatus 30 may not include any side rails.

A headboard 52 and a footboard 54 are coupled to the intermediate frame 36. In other embodiments, when the headboard 52 and footboard 54 are included, the headboard 52 and footboard 54 may be coupled to other locations on the patient support apparatus 30, such as the base 34. In still other embodiments, the patient support apparatus 30 does not include the headboard 52 or the footboard 54.

Operator (human control) interfaces 56, such as handles, are shown integrated into the footboard 54 and side rails 44, 46, 48, 50 to facilitate movement of the patient support apparatus 30 over the floor surfaces. Additional operator interfaces 56 may be integrated into the headboard 52 and/or other components of the patient support apparatus 30. The operator interfaces 56 are graspable by the operator to manipulate the patient support apparatus 30 for movement. The operator interface 56 may comprise one or more handles coupled to the intermediate frame 36. The operator interface 56 may simply be a surface on the patient support apparatus 30 upon which the operator locally applies force to cause movement of the patient support apparatus 30 in one or more directions, also referred to as a push location. This may comprise one or more surfaces on the intermediate frame 36 or base 34. This could also comprise one or more surfaces on or adjacent to the headboard 52, footboard 54, and/or side rails 44, 46, 48, 50. In other embodiments, the operator interface 56 may comprise separate handles for each hand of the operator. For example, the operator interface 56 may comprise two handles. Other forms of the operator interface 56 are also contemplated.

One or more caster (wheel) assemblies 58 are coupled to the base 34 to facilitate transport over floor surfaces. In one example, as shown in FIG. 1, four caster assemblies 58a-58d are arranged in each of four quadrants of the base 34 adjacent to corners of the base 34. In the embodiment shown, the caster assemblies 58a-58d are able to rotate and swivel relative to the support structure 32 during transport.

The caster assemblies 58 may be non-steerable, steerable, non-powered, powered (driven), or any combinations thereof. The caster assemblies 58 may have any suitable shape or configuration other than those shown in the Figures.

The patient support apparatus 30 may comprise any suitable number of caster assemblies 58, such as two or six, etc. The caster assemblies 58 may have any suitable configuration and arrangement depending on the specific type of patient support apparatus 30. For example, when the patient support apparatus 30 is a wheelchair, the patient support apparatus 30 may comprise two front non-driven caster assemblies 58 and two rear driven caster assemblies 58.

The caster assembly 58 comprises one or more wheels that may be airless (non-pneumatic), inflatable, pneumatic or semi-pneumatic. The caster assembly 58 may be coupled to the base 34 according to any suitable manner and using any suitable fastening mechanism. Caster assemblies 58 and structures, functions and applications thereof may be like those described in U.S. Patent Application Publication No. 2016/0089283, entitled "Patient Support Apparatus," the disclosure of which is hereby incorporated by reference in its entirety.

Additionally, one or more auxiliary wheels 66 (powered or non-powered) may be coupled to the support structure 32. The auxiliary wheel 66 may be movable between a stowed position and a deployed position. In some cases, when these auxiliary wheels 66 are located between the caster assemblies 58 and contact the floor surface in the deployed position, they cause two of the caster assemblies 58 to be lifted off the floor surface thereby shortening a wheel base of the patient support apparatus 30. Such auxiliary wheels 66 may also be arranged substantially in a center of the base 34.

The patient support apparatus 30 comprises a controller 68 in communication with and for controlling any suitable components of the patient support apparatus 30, such as the electrical or electromechanical components described herein. The controller 68 may comprise any suitable signal processing means, computer executable instructions or software modules stored in non-transitory memory wherein the executable instructions or modules may be executed by a processor, or the like. Additionally, or alternatively, the controller 68 may comprise a microcontroller, a processor, one or more integrated circuits, logic parts, and the like for enabling the same. The controller 68 may have any suitable configuration for enabling performance of various tasks related to operation of the patient support apparatus 30, such as those described below. The controller 68 may be located at any suitable location of the patient support apparatus 30.

As shown in FIG. 1, the patient support apparatus 30 may comprise one or more steering motors 70a-70d for changing an orientation of the caster assemblies 58 about a swivel axis. The steering motor 70 may be coupled to the stem 60 of the caster assembly 58. Each steering motor 70 may change the orientation of the caster assemblies 58 to facilitate steering of the patient support apparatus 30. For example, the steering motors 70 may change the orientation of the caster assemblies 58 to help move patient support apparatus 30 in the direction desired by the caregiver. One steering motor 70 may be associated with each caster assembly 58, and more specifically, the stem 60 of the caster assembly 58. Alternatively, the steering motors 70 may be associated with only certain caster assemblies 58, e.g., the front-leading caster assemblies 58a, 58b. The steering motors 70 may be located inside or outside the respective caster assembly 58.

The steering motors 70 may be coupled to the controller 68. The steering motors 70 may be directly wired to the controller 68 or in wireless communication with the controller 68. The steering motors 70 may receive control signals from the controller 68 commanding reorientation of the respective caster assemblies 58. For example, the control signals may be derived from the controller 68 receiving readings indicative of user applied force and direction of force when pushing patient support apparatus 30. Additional examples of control signals provided by the controller 68 to effect reorientation by the steering motors 70 are described below. Steering motors 70 and techniques for generating signals for controlling the same may be like those described in U.S. Patent Application Publication No. 2016/0089283, entitled "Patient Support Apparatus," the disclosure of which is hereby incorporated by reference in its entirety.

A drive motor 72a-72e may be associated with the respective caster assembly 58 or with the auxiliary wheels 66, as shown in FIG. 1. The drive motor 72 is configured to cause the caster assembly 58 or auxiliary wheel 66 to rotate about the rotational axis R of the wheel. The drive motors 72 are coupled to the controller 68. The drive motors 72 may be directly wired to the controller 68 or in wireless communication with the controller 68. The drive motor 72 is configured to cause the caster assembly 58 or auxiliary wheel 66 to rotate in response to receiving control signals provided by the controller 68. For example, the controller 68 may command the drive motor 72 to rotate the respective caster assembly 58 or auxiliary wheel 66 to effect a desired velocity for the patient support apparatus 30 based on user input and/or sensed readings relating to the environment of the patient support apparatus 30. The drive motor 72 may be located inside of or coupled to the outside of the respective caster assembly 58 or auxiliary wheel 66. Drive motors 72 and techniques for generating signals for controlling the same may be like those described in U.S. Patent Application Publication No. 2016/0089283, entitled "Patient Support Apparatus," the disclosure of which is hereby incorporated by reference in its entirety.

The patient support apparatus 30 further includes a braking system for the caster assemblies 58 or auxiliary wheel 66. Specifically, a brake mechanism 74, as shown in FIG. 1, may be provided to engage/disengage braking. The brake mechanism 74 may be manually positionable to engage/disengage braking. The braking mechanism 74 may include a pedal (as shown in FIG. 1), a handle, or the like. The braking system may interconnect more than one caster assembly 58 to provide simultaneous braking thereof. Each caster assembly 58 can be associated with a specific brake mechanism 74 or more than one device can be associated with one brake mechanism 74. The braking system may have any suitable configuration for the patient support apparatus 30. Examples of braking systems for the patient support apparatus 30 can be like those described in U.S. Pat. No. 8,006,332, entitled "Hospital Bed," the disclosure of which is hereby incorporated by reference in its entirety.

The patient support apparatus 30 requires power for energizing one or more electrically powered devices coupled to the patient support apparatus 30, such as those described above, in addition to any display devices, sensors, actuators, sub-systems (e.g., patient scale system), and the like. In one embodiment, the patient support apparatus 30 comprises an energy storage device 76, as shown in FIG. 1, which is coupled to the one or more devices through an electrical distribution of the patient support apparatus 30. The energy storage device 76 may be any suitable device for storing energy to power the electrical devices. For example, the energy storage device 76 may be a battery, such as a Lead-acid or Lithium ion battery, a capacitor (such as a supercapcitor), or the like. The energy storage device 76 may be a primary cell (one use) or a rechargeable cell (more than one use). The energy storage device 76 may be disposed at any suitable location on the patient support apparatus 30 or components thereof. For example, as shown in FIG. 1, the energy storage device 76 is fixed to the base 34. The patient support apparatus 30 may comprise any number of energy storage devices 76, which may be of a similar type or of different types. The controller 68 may comprise and/or control switches, relays, logic, circuits or any other suitable hardware and/or software for managing energy supplied to and/or energy discharged from the energy storage device 76. The energy storage device 76 may be of any suitable configuration for powering the devices of the patient support apparatus 30.

II. Power Transfer Techniques

Figure 2:
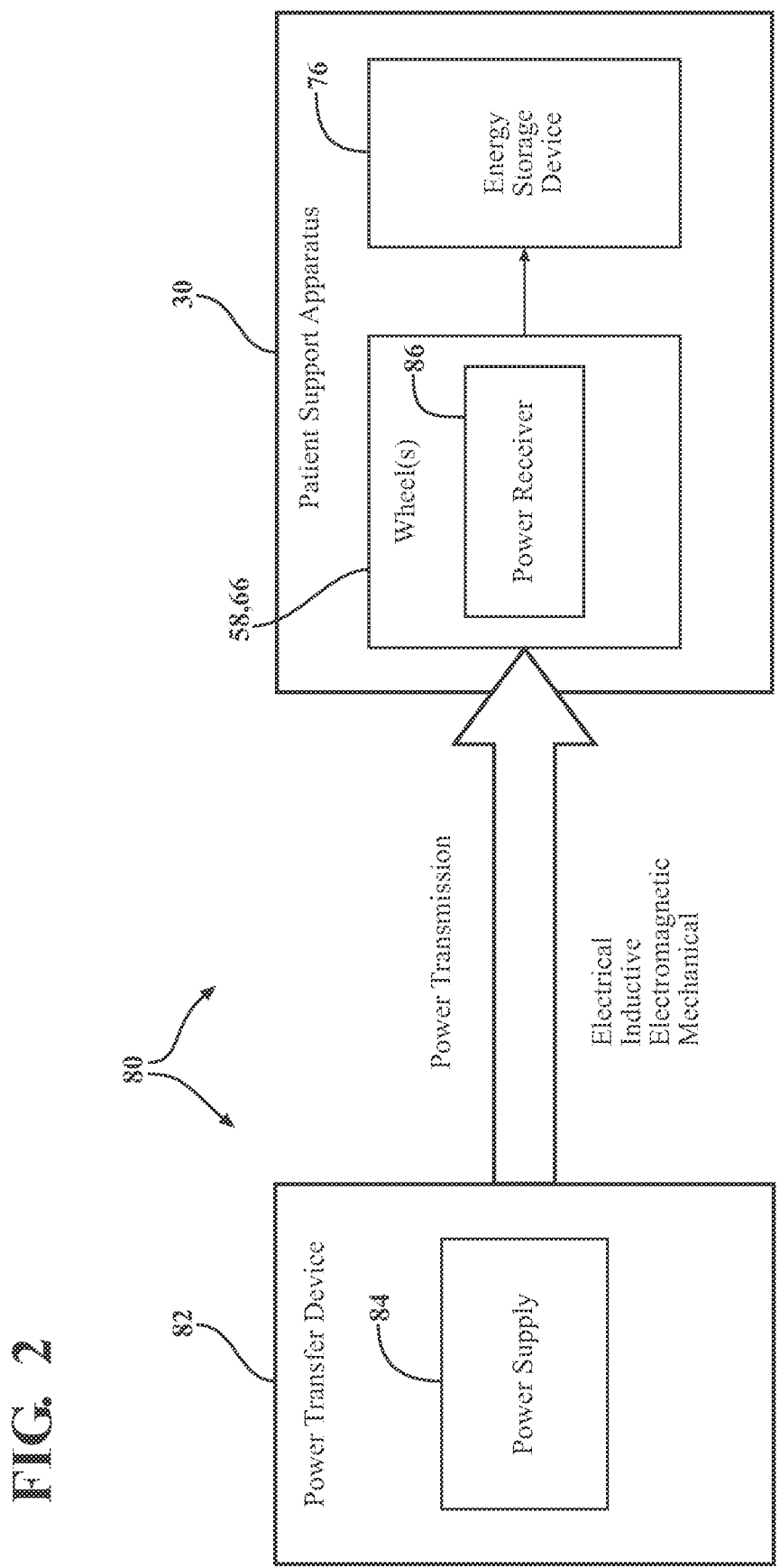
FIG. 2 is block diagram of one example of a power transfer system comprising the patient support apparatus having a power receiver integrated with one or more wheels and further comprising a separate power transfer device energizable to interact with the wheel to facilitate power transfer to the power receiver through the wheel.

In accordance with FIGS. 2-16, techniques are shown for transferring power to the patient support apparatus 30. As will be understood from the various embodiments below, power is transferred wirelessly to the patient support apparatus 30. In other words, power is transferred to the patient support apparatus 30 without using a direct electrical and physical connection to the patient support apparatus 30 using a conductive wire/cable/cord (such as an electrical cord that is plugged into an electrical outlet). As used herein, the term "wireless" relates to the transfer of power and may embody various wireless techniques for transferring power to the patient support apparatus 30, such as electrical, inductive, electromagnetic, and mechanical techniques, as shown in FIG. 2. Thus, the term "wireless" is not limited to radio frequency or microwave signal transfer, as generally used in communication systems.

As shown in FIG. 2, a power transfer system 80 is provided to implement wireless transfer of power. The power transfer system 80 includes the patient support apparatus 30 and a power transfer device 82. The power transfer device 82 is separate and otherwise independent from the patient support apparatus 30. In other words, the power transfer device 82 is external to the patient support apparatus 30, rather than being integrated therewith.

The power transfer device 82 is configured to interact with the patient support apparatus 30 to enable wireless power transfer thereto. As will be understood from the embodiments below, such interaction may be implemented according to various techniques, which avoid direct-wired electrical connection. The power transfer device 82 is energizable to interact with the patient support apparatus 30. Thus, the power transfer device 82 is not simply passively interacting with the patient support apparatus 30, but is rather actively energized to interact therewith. As shown in FIG. 2, the power transfer device 82 may be coupled to, or otherwise include, a power supply 84. The power transfer device 82 may be energized using energy from the power supply 84. The power supply 84 may be any suitable source of power, such as another energy storage device (battery, etc.) or may be general-purpose alternating-current (AC)

electric power supply of a facility, such as a hospital, or the like. It is to be appreciated that the power transfer device 82 may be energized using any other source of power besides electrical power, such as mechanical and/or chemical-based power, or the like.

As shown in FIG. 2, the patient support apparatus 30 comprises a power receiver 86. The power receiver 86 is configured to interact with the power transfer device 82 to facilitate wireless power transfer to the patient support apparatus 30 from the power transfer device 82. The term "receiver" in power receiver 86 is not limited to only receiving power. Additionally or alternatively, the power receiver 86 may generate (produce) or transduce (convert) power in response to interaction between the power transfer device 82 and the patient support apparatus 30. Examples of the power receiver 86 are described in various embodiments below.

The energy storage device 76 of the patient support apparatus 30 may be coupled to the power receiver 86. The power receiver 86 is configured to provide power received from transfer using the power transfer device 82 to the energy storage device 76 such that the energy storage device 76 can be charged for energizing any of the powered devices of the patient support apparatus 30.

In accordance with FIGS. 2-16, the power receiver 86 is integrated specifically with one or more of the wheels 58, 66 of the patient support apparatus 30. The power transfer device 82 interacts with one or more of the wheels 58, 66. Thus, the power transfer device 82 facilitates power transfer to the power receiver 86 through one or more of the wheels 58, 66.

The wheel 58, 66 that includes the power receiver 86 may be one or more caster assembly 58, the auxiliary wheel 66, or any other wheel that facilitates movement of the patient support apparatus 30 along the floor surface. The power receiver 86 may be integrated with any actively steerable wheel, any actively driven wheel, any passive wheel, or the like. A separate power receiver 86 may be integrated with any number of wheels 58, 66. In one embodiment, a separate power receiver 86 may be integrated with each of the four caster assemblies 58a-58d in FIG. 1. Additionally or alternatively, any wheel 58, 66 may integrate any number of power receivers 86.

Furthermore, an entirety of the power receiver 86 and any components thereof, may be integrated with the wheel 58, 66. Alternatively, primary power receiving components of the power receiver 86 may be integrated with the wheel 58, 66, while secondary components of the power receiver 86, such as ancillary components or electrical connections, are located elsewhere other than the wheel 58, 66, such as on the support structure 32, with the controller 68, or the like. In either situation, the power receiver 86 is integrated with the wheel 58, 66 so that power is transferred to the patient support apparatus 30 using the wheel 58, 66. Integration of the power receiver 86 with the wheel 58, 66 may be further understood from the various examples below.

The power receiver 86 may be integrated into any suitable part of the wheel 58, 66. For example, the power receiver 86 may be integrated with any one or more of a motor 70, 72, a tire 88, a rim 90 (hub), an axle 92 of the wheel 58, 66, and the like. The power receiver 86 also may be integrated into a stem of the caster assembly 58, which couples to the base 34.

In any of the embodiments described herein, electrical coupling is made to the wheel 58, 66 to energize or activate the power receiver 86 and any components associated therewith that are integrated with the wheel 58, 66. Such electrical coupling may be wireless or wired and may be routed through any suitable part of the wheel 58, 66, such as through the motor 70, 72, the tire 88, the rim 90, the axle 92, and the like. Examples of such electrical coupling, and techniques for interrupting such coupling, are described below.

As shown in embodiments of FIGS. 3-13, wireless power transfer is implemented using electrically driven power transfer between the power transfer device 82 and the power receiver 86 of the wheel 58, 66. Specifically, electrically driven power transfer may be implemented using inductive power transfer and/or capacitive power transfer. To implement these techniques, the patient support apparatus 30 is moved towards the power transfer device 82 such that the wheel 58, 66, and hence, the power receiver 86 is proximate to the power transfer device 82 in a spaced apart relationship. The power transfer device 82 and the power receiver 86 each are equipped with energizable electrical elements. The power transfer device 82 is energized and inductive and/or capacitive interaction is created between the electrical elements of the power transfer device 82 and the power receiver 86. Power is transferred to the power receiver 86 in response to the inductive and/or capacitive interaction.

Figure 3:
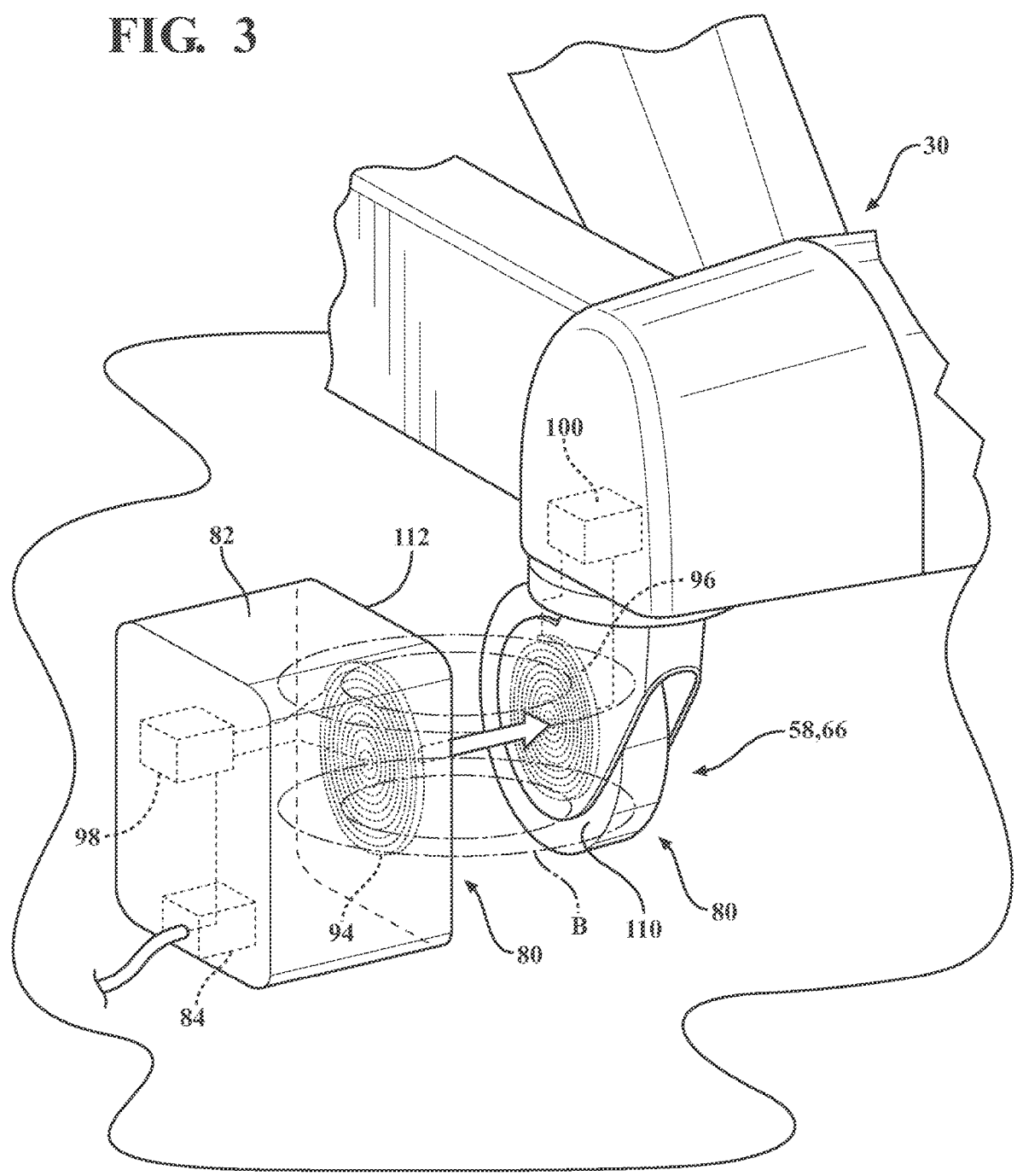
FIG. 3 is a perspective view, partially in phantom, showing inductive power transfer between the power transfer device and the power receiver of the wheel of the patient support apparatus, according to one example.

As for inductive power transfer, and referring to FIG. 3, the power transfer device 82 comprises a sending coil 94 and the power receiver 86 comprises a receiving coil 96. Inductive power transfer occurs from the sending coil 94 to the receiving coil 96. The coils 94, 96 are each electrical inductors and are operable together to form a transformer. The power transfer device 82 may comprise a transmitter circuit 98, such as an oscillator, coupled to the power supply 84 for energizing the sending coil 94 using AC current. As the AC current passes through the sending coil 94, a magnetic field (B) is generated and passes through the receiving coil 96. Upon wirelessly receiving the magnetic field (B), the receiving coil 96 induces AC current. The power receiver 86 may comprise a receiver circuit 100 for receiving the AC current induced by the receiving coil 96. For example, the receiver circuit 100 may be a rectifier circuit for converting the AC current into DC current suitable for the patient support apparatus 30 and/or energy storage device 76.

In some embodiments, one or both coils 94, 96 may be tuned or otherwise equipped with electrical components for enabling resonant inductive coupling therebetween. In such situations, the coils 94, 96 resonate at a common resonant frequency for increasing the effectiveness of power transfer. It should be appreciated that inductive coupling between the power transfer device 82 and the power receiver 86 may be implemented according to other techniques. Furthermore, the coils 94, 96, the transmitter circuit 98, and the receiver circuit 100 may have any other configuration or geometry for enabling inductive power transfer.

Figure 4:
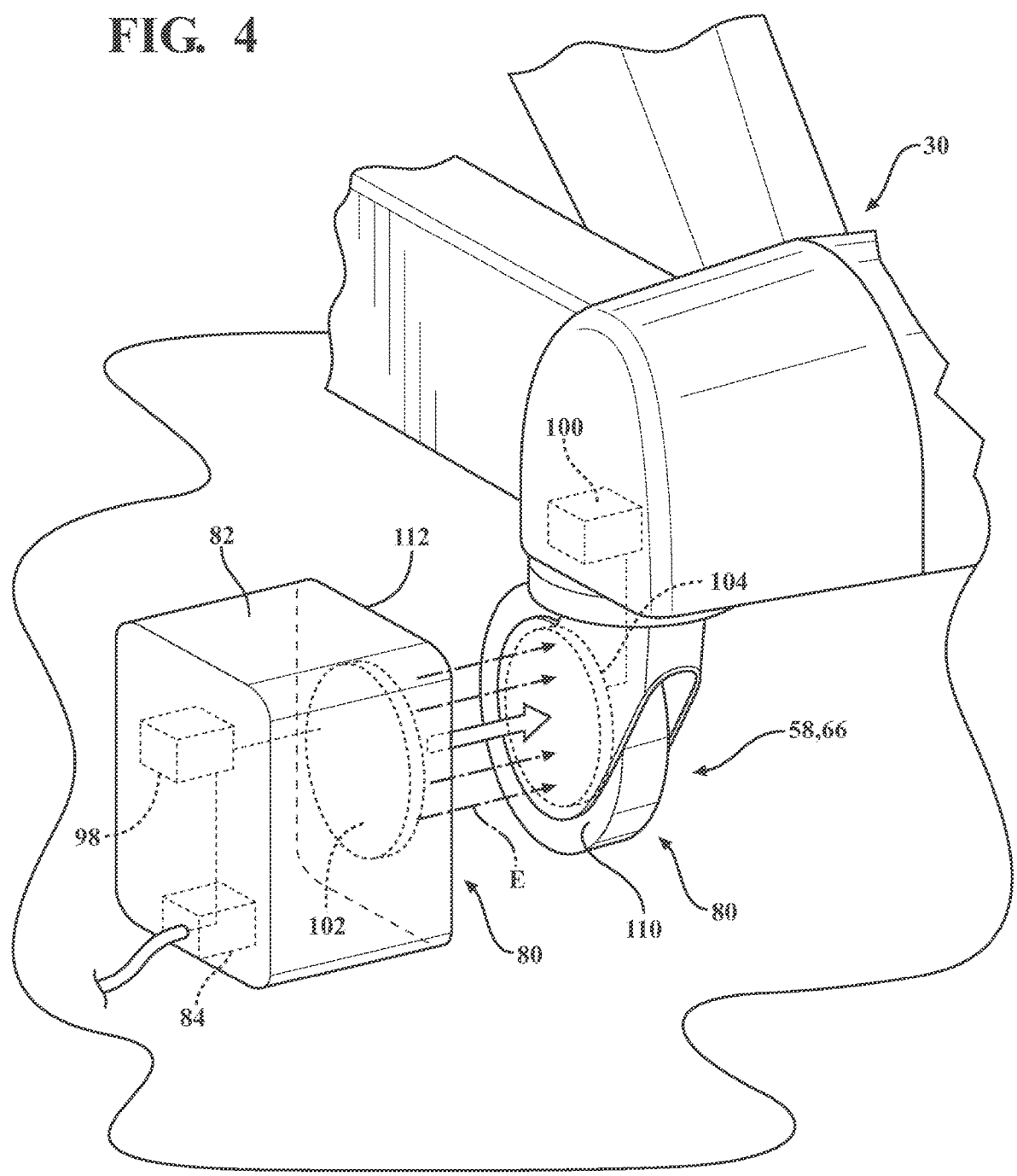
FIG. 4 is a perspective view, partially in phantom, showing capacitive power transfer between the power transfer device and the power receiver of the wheel of the patient support apparatus, according to one example.

For capacitive power transfer, and referring to FIG. 4, the power transfer device 82 comprises a sending plate 102 and the power receiver 86 comprises a receiving plate 104. Capacitive power transfer occurs from the sending plate 102 to the receiving plate 104. The plates 102, 104 are each electrical conductors (e.g., electrodes) and are operable together to form a capacitor. The transmitter circuit 98 applies AC voltage to the sending plate 102. In turn, an electric field (E) is generated and passes to the receiving plate 104. Upon wirelessly receiving the electric field (E), the receiving plate 104 induces AC voltage. The receiver circuit 100 utilizes the AC voltage to facilitate the flow of AC current suitable for the patient support apparatus 30 and/or energy storage device 76.

In FIG. 4, each of the power transfer device 82 and the power receiver 86 comprise one plate 102, 104 thereby implementing a unipolar configuration. Here, the power transfer device 82 and the power receiver 86 each comprise a passive grounding electrode (not shown) for providing an electrical return path for the AC current back to the power transfer device 82. Thus, energy is transferred in one direction between the plates 102, 104, i.e., from plate 102 to plate 104. For the power receiver 86, the passive grounding electrode may be the base 34 of the patient support apparatus 30, a conductive portion of the wheel 58, 66 or any other conductive element providing electrical grounding.

However, in other embodiments, a bipolar configuration may be implemented wherein the each of the power transfer device 82 and the power receiver 86 comprise two plates 102a, 102b and 104a, 104b, corresponding with each other, respectively. The electrical field (E) passes through one pair of plates 102a, 104a to create AC current at the power receiver 86 and then the electrical field (E) passes through the second pair of plates 102b, 104b to return AC current at the power transfer device 82, and so on. Thus, energy is transferred bi-directionally, in a looped-fashion, between the respective plate pairs 102a, 104a and 102b, 104b.

In some embodiments, one or both plates 102, 104 may be tuned or otherwise equipped with electrical components for enabling resonant capacitive coupling therebetween. It should be appreciated that capacitive coupling between the power transfer device 82 and the power receiver 86 may be implemented according to other techniques. Furthermore, the plates 102, 104, the transmitter circuit 98, and the receiver circuit 100 may have any other configuration or geometry for enabling capacitive power transfer.

For simplicity, each of the embodiments of FIGS. 5-11 show inductive means of transferring power using the coils 94, 96. However, based on the similarities in inductive and capacitive power transfer techniques using spaced apart and wireless means of transferring power between opposing electrical elements, those skilled in the art appreciate that the coils 94, 96 in any of FIGS. 5-11 may be replaced with the plates 102, 104 to illustrate capacitive power transfer. In other words, capacitive power transfer is fully contemplated for each of these examples. It should be understood that the specific geometries of the coils 94, 96 and/or specific integration of the coils 94, 96 with the wheel 58, 66 may differ from specific geometries and/or integration of the plates 102, 104 for each of these examples. This is due to the nature of inductive power transfer requiring coils and capacitive power transfer requiring plates for proper operation. However, those skilled in the art can readily recognize specific geometries and/or integration of the plates 102, 104 in view of the teachings described herein relating to the coils 94, 96. To capture this commonality, the coils 94, 96 and/or the plates 102, 104 in the embodiments described below are referred to as electrical receiving elements when integrated with the power receiver 86 and electrical sending elements when integrated with the power transfer device 82.

Figure 5:
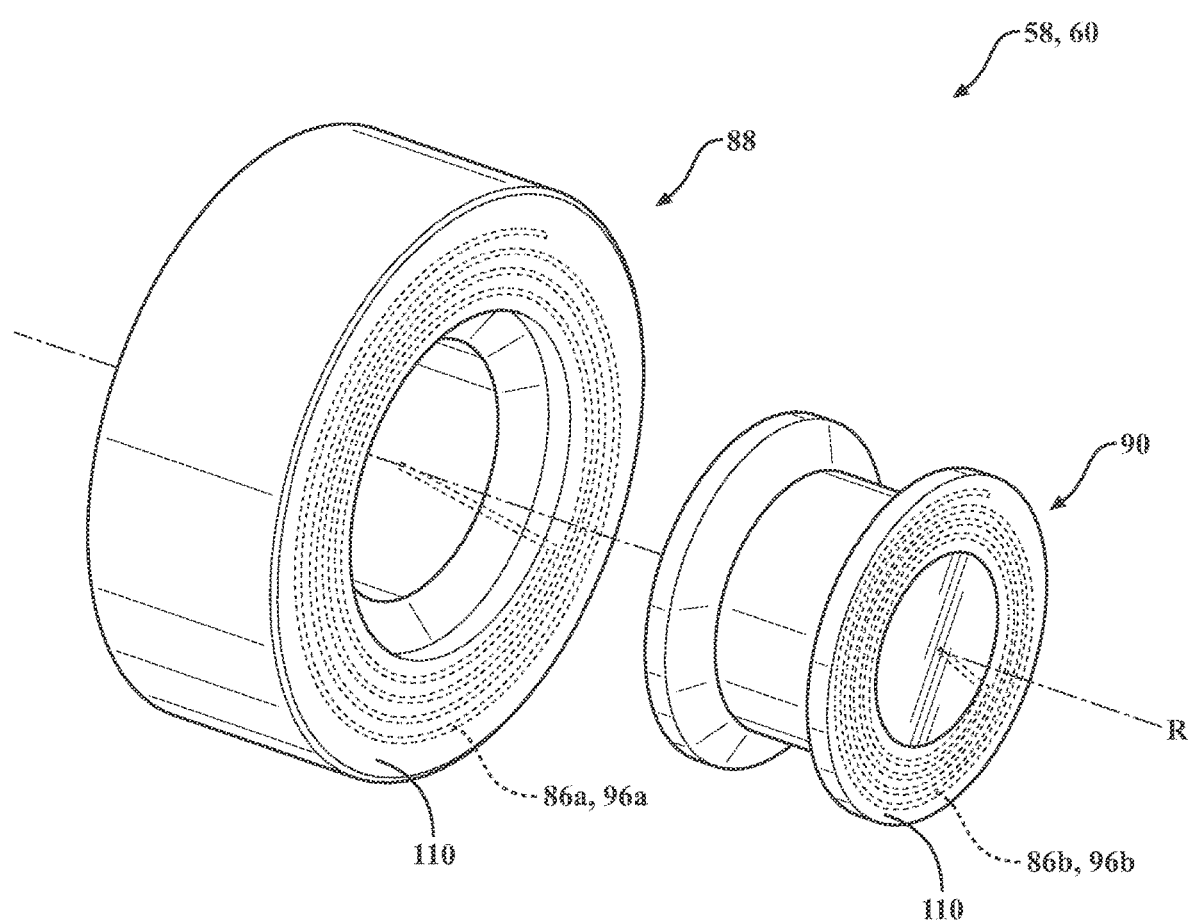
FIG. 5 is an assembly view of a tire and a rim of the wheel of the patient support apparatus according to one example, wherein the tire and the rim each include electrical receiving elements of the power receiver aligned with an exterior face of the wheel.

Referring to FIG. 5, two examples are shown wherein the power receiver 86 is integrated with the wheel 58, 66 of the patient support apparatus 30. In one example, the power receiver 86a is integrated with the tire 88 and in the other example the power receiver 86b is integrated with the rim 90 supporting the tire 88. Specifically, an electrical receiving element of the power receiver 86, such as the receiving coil 96a, 96b is integrated with the tire 88 and integrated with the rim 90. These examples may be implemented individually or in combination.

Wireless power transfer through the wheel 58, 66 in these examples takes advantage of the wheel 58, 66 being rotatable about an axis of rotation (R). For example, in both examples in FIG. 5, the electrical receiving element 96 is disposed radially about the axis of rotation R. Therefore, the electrical receiving element 96 rotates with rotation of the wheel 58, 66. This allows predictable exposure to the electrical receiving element 96 and effective power transfer to the electrical receiving element 96, whether the wheel 58, 66 is stationary or rotating.

In the examples of FIG. 5, the wheel 58, 66 comprises an exterior face 110 that is perpendicular to the floor surface. In other words, the exterior face 110 is the disc-shaped part of the wheel 58, 66 that is perpendicular to the axis of rotation R of the wheel 58, 66. Here, the electrical receiving element 96 of the power receiver 86 comprises an area, or a footprint, that is aligned with the exterior face 110. For example, the electrical receiving element 96 is disposed parallel to the exterior face 110. Therefore, the electrical receiving element 96 is perpendicular to the axis of rotation R of the wheel 58, 66. In the example with the tire 88, the receiving element 96 is integrated directly on or behind the exterior face 110. In the example with the rim 90, the electrical receiving element 96 is disposed directly on a portion of the rim 90 that is exposed to the exterior face 110. The electrical receiving element 96 may be integrated with the tire 88 and/or rim 90 according to other techniques.

Since the electrical receiving element 96 is aligned with the exterior face 110, the power transfer device 82 can interact with the exterior face 110 of the wheel 58, 66 to establish coupling to the electrical receiving element 96. Furthermore, since the electrical receiving element 96 is aligned with the exterior face 110, at least some portion of the electrical receiving element 96 is raised vertically off the floor surface.

Accordingly, as shown in FIGS. 3, 4, 6 and 7, the power transfer device 82 comprises a vertical member 112 being perpendicular to the floor surface. The vertical member 112 comprises one or more electrical sending elements 94, e.g., the sending coil 94 or the sending plate 102, which are raised vertically off the floor surface. The electrical sending element 94 of the vertical member 112 may be elevated to a predetermined height to correspond to the known height of the electrical receiving element 96 relative to the wheel 58, 66. In some examples, the vertical member 112 may allow for manual or automatic adjustment of the height of the electrical receiving element 96 for various size wheels 58, 66. When the wheel 58, 66 is moved adjacent to the vertical member 112, interaction between the exterior face 110 and the vertical member 112 occurs to facilitate interaction between the electrical receiving element 96 of the power receiver 86 and the electrical sending element 94 of the power transfer device 82 to transfer power. The electrical sending elements 94 and the electrical receiving elements 96 may have configurations other than those shown in the Figures.

In one example, the vertical member 112 of the power transfer device 82 is installed into a fixture or wall of a facility. In other examples, the vertical member 112 is coupled to a docking station for the patient support apparatus 30. The vertical member 112 may also be on a stationary or mobile unit.

Figure 6:
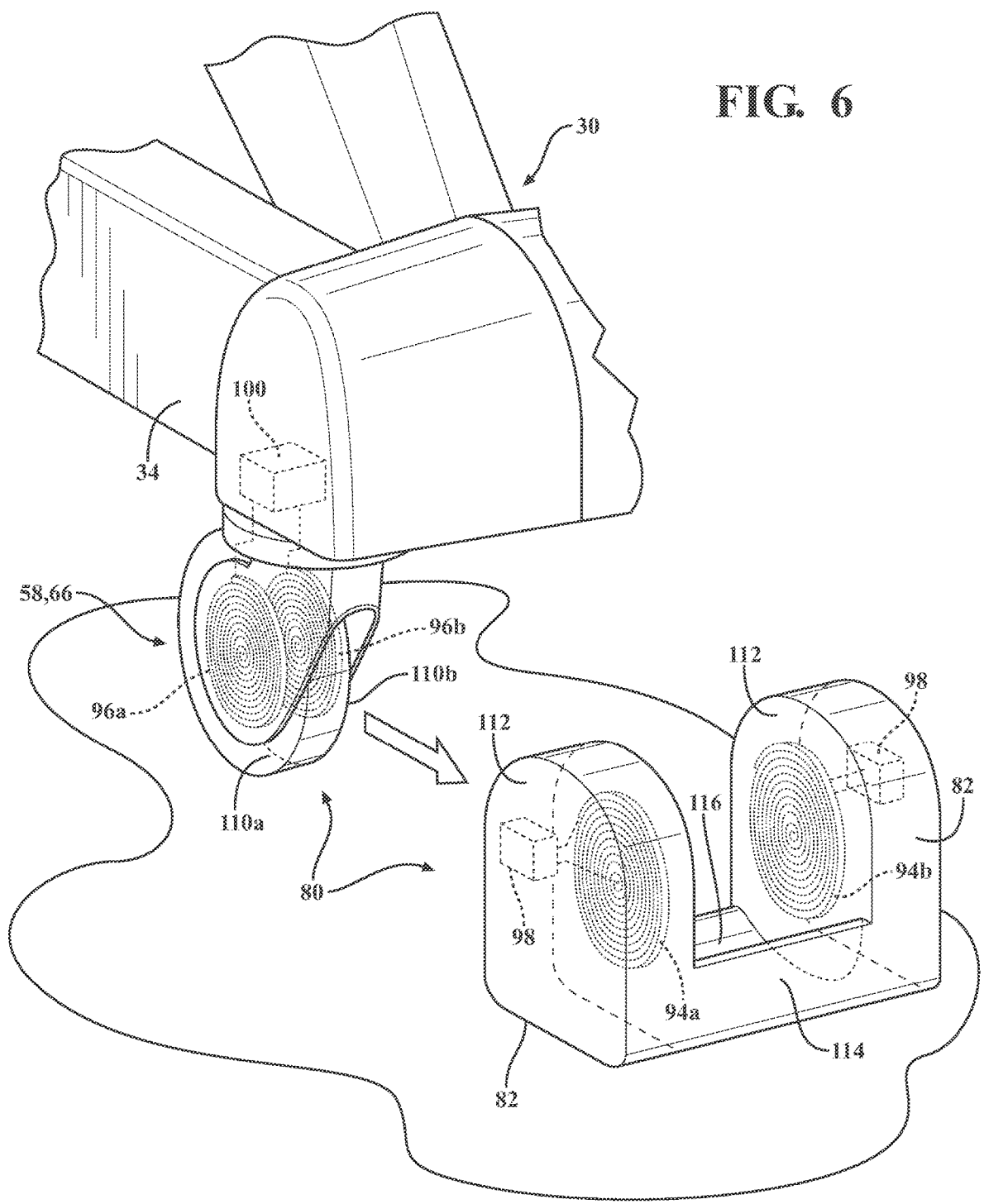
FIG. 6 is a perspective view, partially in phantom, of the power transfer device comprising electrical sending elements on vertical members for interacting with opposing exterior faces of the wheel and with the power transfer device including mechanical features to retain the wheel for stationary power transfer.

In the example of FIG. 6, the wheel 58, 66 comprises two electrical receiving elements 96a, 96b each aligned with respective opposing exterior faces 110a, 110b of the wheel 58, 66. The power transfer device 82 comprises two vertical members 112a, 112b respectively comprising electrical sending elements 94*a*, 94*b*. The electrical sending elements 94*a*, 94*b* are configured to interact respectively with electrical receiving elements 96*a*, 96*b* for effectively doubling the power transfer capabilities for a single wheel 58, 66. Of course, one vertical member 112 may be used instead of two.

In this example, the power transfer device 82 interacts with the wheel 58, 66 when the wheel 58, 66 is stationary and power transfer occurs between the power transfer device 82 and the power receiver 86 when the wheel 58, 66 is stationary. Specifically, the power transfer device 82 may comprise a stop 114 being configured to stop movement of the wheel 58, 66 to align the power receiver 86 of the wheel 58, 66 with the power transfer device 82. In this example, the power transfer device 82 surrounds the wheel 58, 66. The power transfer device 82 may further include one or more mechanical features 116, such as grooves or channels, for capturing the wheel 58, 66 therein or for rotating the caster assembly 58 to establish proper stationary wheel alignment for power transfer. The power transfer device 82, vertical member 112, stop 114, and mechanical features 116 may have configurations other than those shown in the figures.

In some embodiments, the power transfer device 82 is configured to interact with the wheel 58, 66 to facilitate power transfer between the power transfer device 82 and the power receiver 86 when the wheel 58, 66 is moving. The power transfer device 82 extends along the floor surface according to any suitable length to enable power transfer to the moving wheel 58, 66. The power transfer device 82 interacting with the moving wheel 58, 66 may be suitable for locations in a facility where frequent moving traffic for patient support apparatuses 30 occurs, such as hallways, doorways, elevators and the like.

Figure 7:
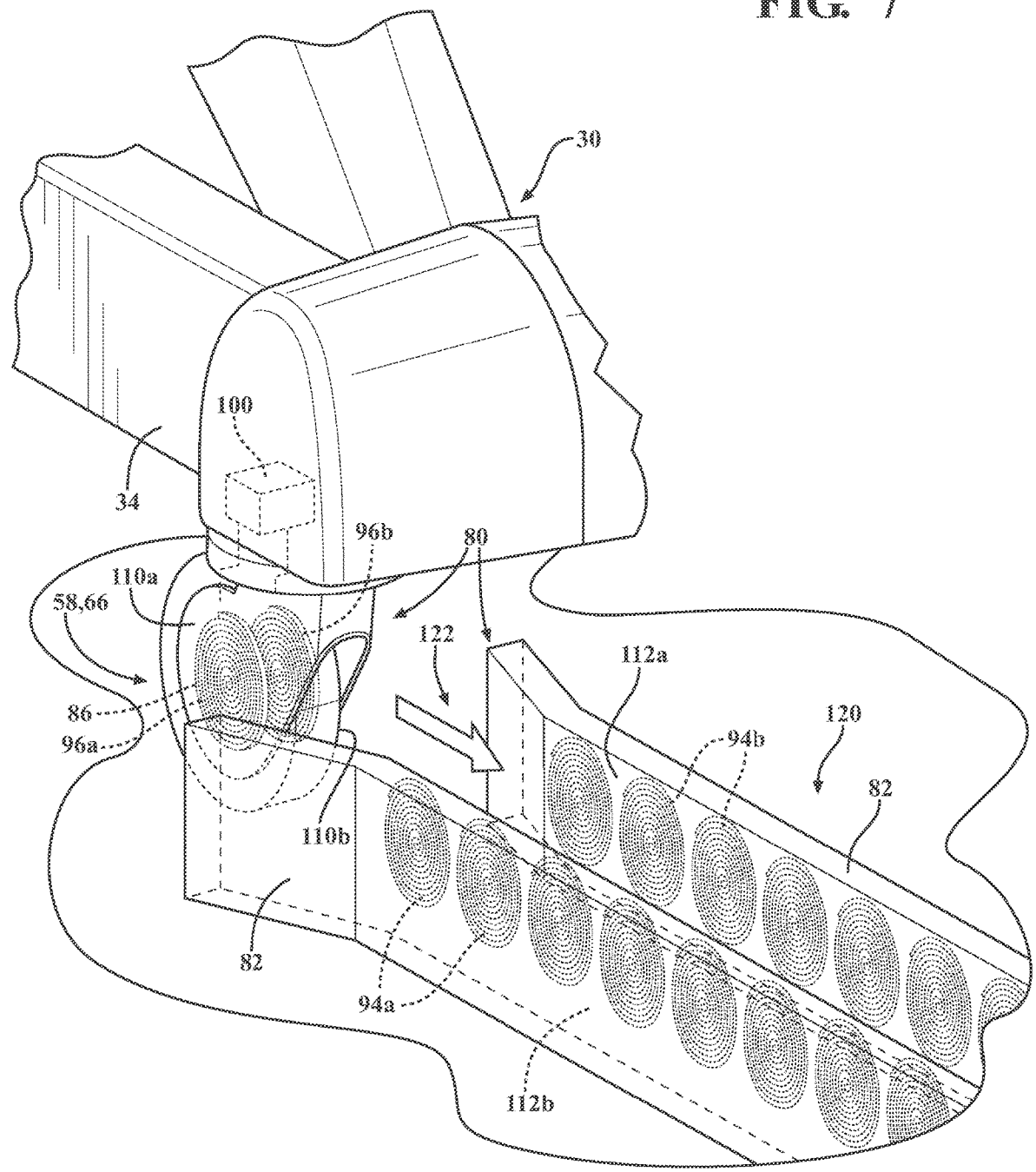
FIG. 7 is a perspective view, partially in phantom, of the power transfer device comprising a guide mechanism for guiding movement of the wheel and comprising electrical sending elements for interacting with electrical receiving elements aligned with opposing exterior faces of the wheel for providing power transfer during wheel movement through the guide mechanism.

In the example of FIG. 7, the power transfer device 82 comprises a guide mechanism 120 configured to mechanically receive the wheel 58, 66 during movement thereof. The wheel 58, 66 comprises two electrical receiving elements 96*a*, 96*b* each aligned with respective opposing exterior faces 110*a*, 110*b* of the wheel 58, 66. The power transfer device 82 comprises two vertical members 112*a*, 112*b*, which define walls of the guide mechanism 120. The vertical members 112*a*, 112*b* extend along the floor surface according to any suitable length to enable power transfer to the moving wheel 58, 66. The vertical member 112*a*, 112*b* may be of a height suitable to enable power transfer, yet low enough so as to not interfere with movement of the patient support apparatus 30. The vertical members 112*a*, 112*b* each respectively comprise a plurality of electrical sending elements 94 disposed along the length. The guide mechanism 120 may comprise an entry 122, which reduces in width to guide the wheel 58, 66 to the vertical members 112*a*, 112*b*. The electrical sending elements 94*a*, 94*b* are configured to interact respectively with the electrical receiving elements 96*a*, 96*b* as the wheel 58, 66 moves through the vertical members 112*a*, 112*b*. Of course, one vertical member 112 may be used instead of two. Furthermore, the guide mechanism 120 and entry 122 may have configurations other than those shown in the figures.

In other examples, the power transfer device 82 may be mobile to interact with the moving wheel 58, 66. For example, the power transfer device 82 may comprise its own wheels and may be configured to latch on to any suitable part of the patient support apparatus 30, such as the base 34. Such latching may occur manually by operator assistance, or may occur automatically by a controller integrated with the power transfer device 82. Once latched, the power transfer device 82 is configured to move along the floor surface with movement of the patient support apparatus 30, and consequently, the wheel 58, 66. After latching, the electrical sending element 94 of the power transfer device 82 is maintained at a fixed, spaced apart, distance from the electrical receiving element 96 of the wheel 58, 66 for facilitating coupling therebetween while the wheel 58, 66 moves. Even though the power transfer device 82 moves along with the patient support apparatus 30 in this example, the electrical sending element 94 may rotate or may be fixed from rotation.

Figure 8:
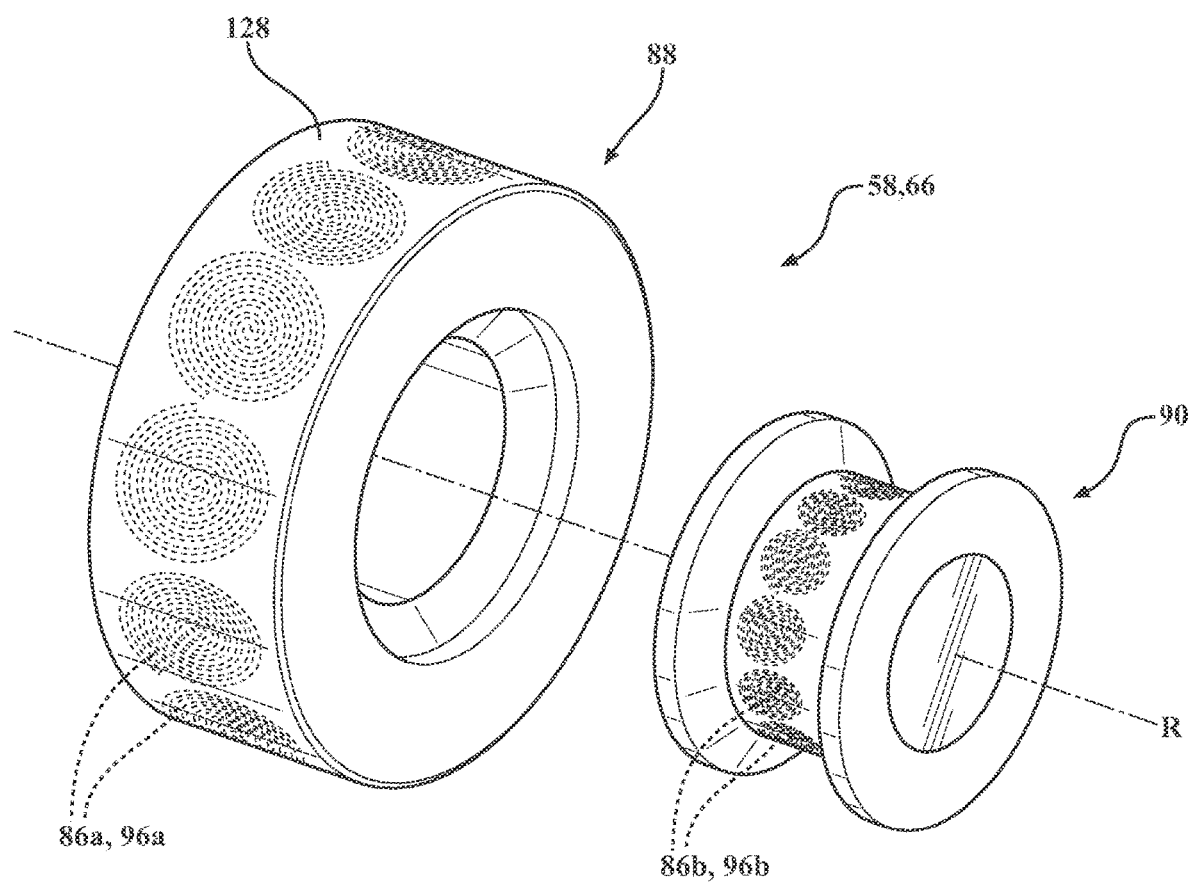
FIG. 8 is an assembly view of the tire and the rim of the wheel of the patient support apparatus according to another example, wherein the tire and the rim each include electrical receiving elements of the power receiver aligned with a contact face of the wheel.

Referring to FIG. 8, two additional examples are shown wherein the power receivers 86*a*, 86*b* are integrated respectively with the tire 88 and the rim 90 of the wheel 58, 66. In the examples of FIG. 8, the wheel 58, 66 comprises a contact face 128 that directly contacts the floor surface when the wheel 58, 66 is stationary or moving. The contact face 128 is thus parallel to, or tangentially touching, the floor surface when contacting the floor surface. The contact face 128 is disposed around the axis of rotation R of the wheel 58, 66. Here, the electrical receiving element 96*a* of the power receiver 86*a* comprises an area, or a footprint, that is aligned with, or otherwise disposed parallel to, the contact face 128. Therefore, the electrical receiving element 96*a* faces the floor surface when the contact face 128 faces the floor surface.

In the example with the tire 88, the electrical receiving elements 96*b* are integrated with the tire 88, such as within or on an interior layer of the tire 88, and are disposed around the axis of rotation R and aligned with the contact face 128. In the example with the rim 90, the electrical receiving elements 96*b* are disposed on the rim 90 and around the axis of rotation R and aligned with the contact face 128. Comparatively, when the aligned portion of the contact face 128 touches the floor surface, the electrical receiving elements 96*a* in the tire 88 example would be closer to the floor surface than the electrical receiving elements 96*b* in the rim 90 example.

Figure 9:
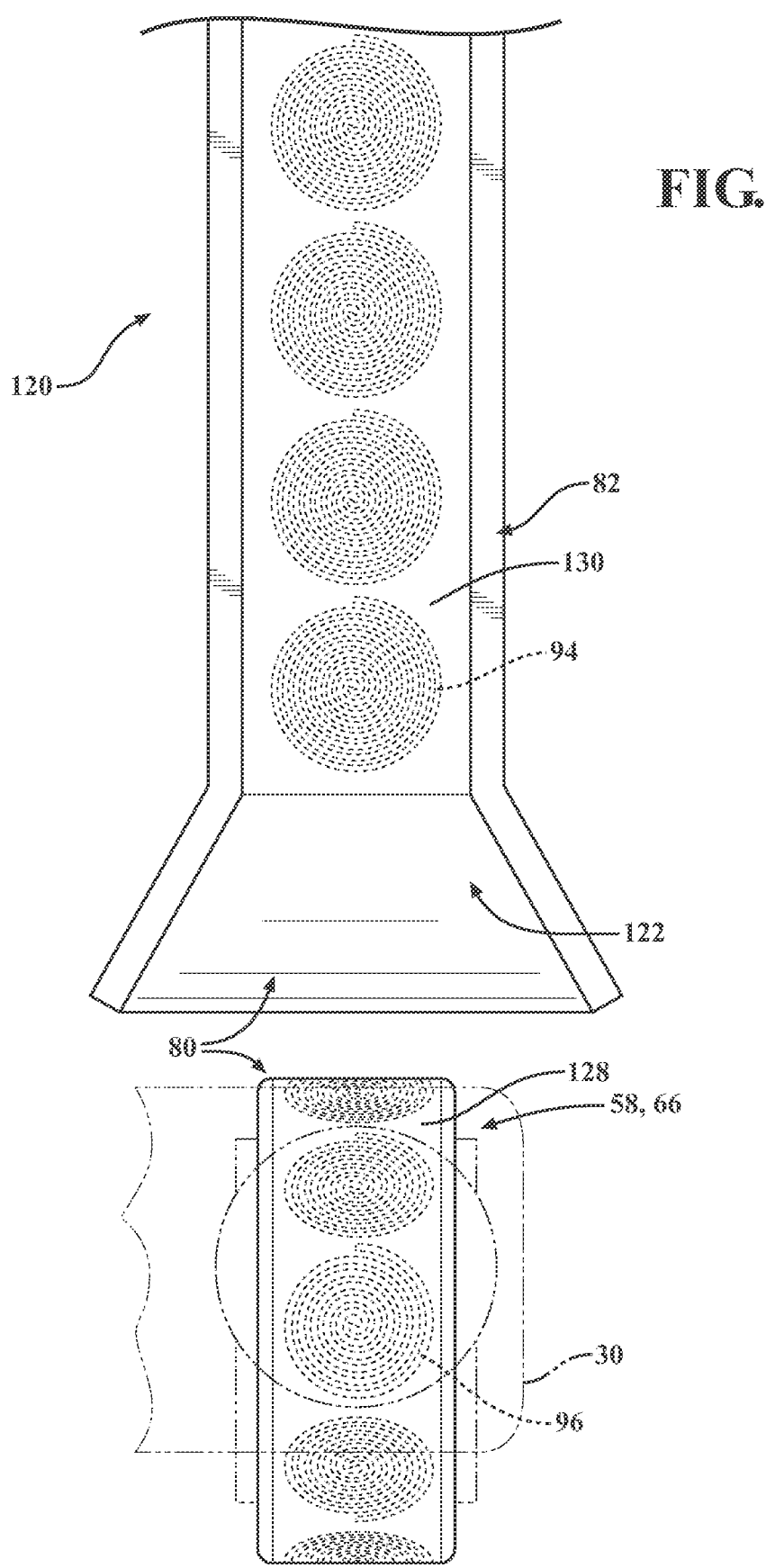
FIG. 9 is a top view, partially in phantom, of the power transfer device comprising another embodiment of the guide mechanism for guiding movement of the wheel and comprising electrical sending elements on a horizontal member being parallel with the floor surface for interacting with the electrical receiving elements aligned with the contact face of the wheel for providing power transfer during wheel movement through the guide mechanism.
Figure 10:
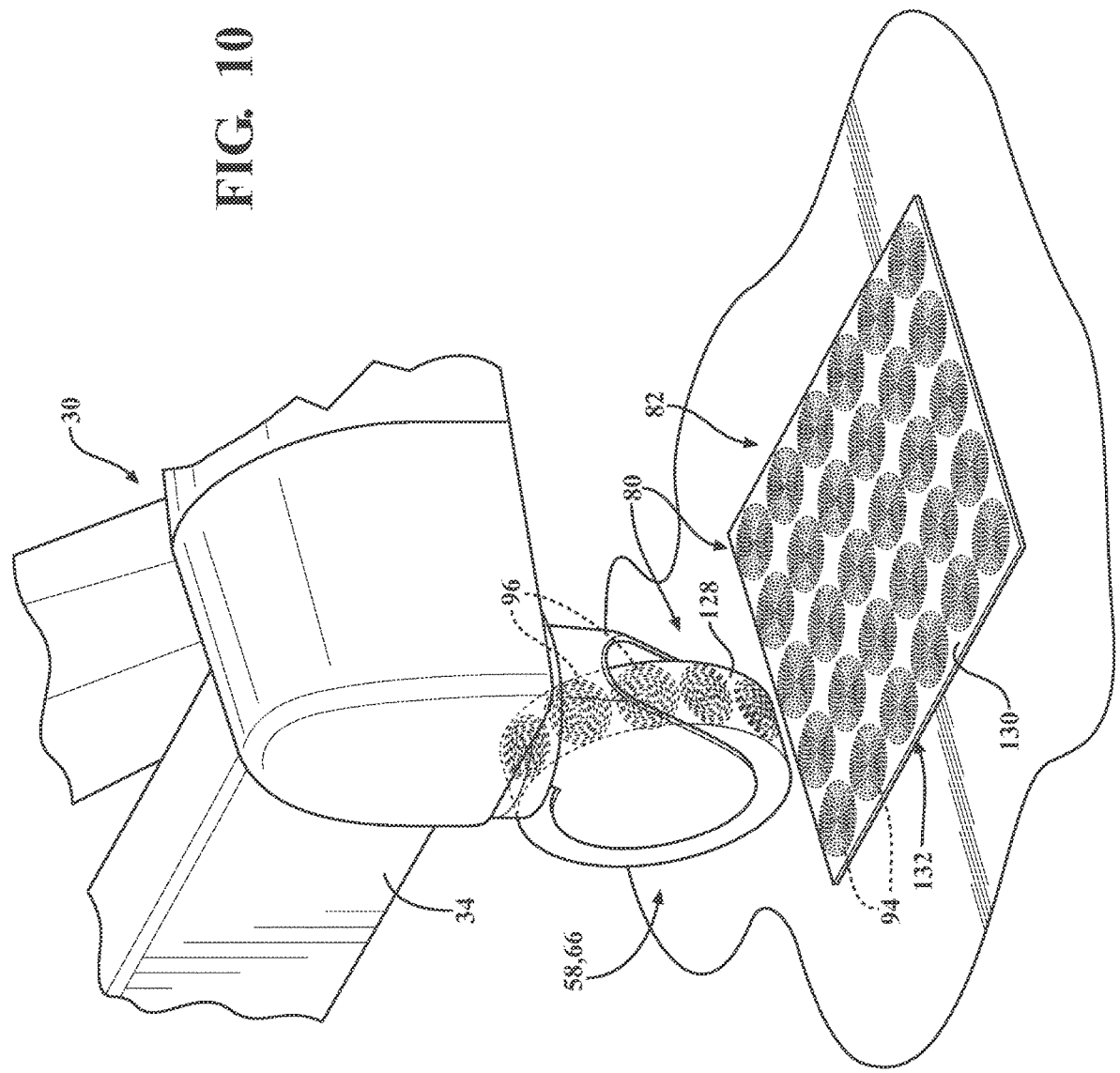
FIG. 10 is a perspective view, partially in phantom, of the power transfer device comprising the horizontal member embodied as a floor mat having electrical sending elements for interacting with electrical receiving elements aligned with the contact face of the wheel.
Figure 11:
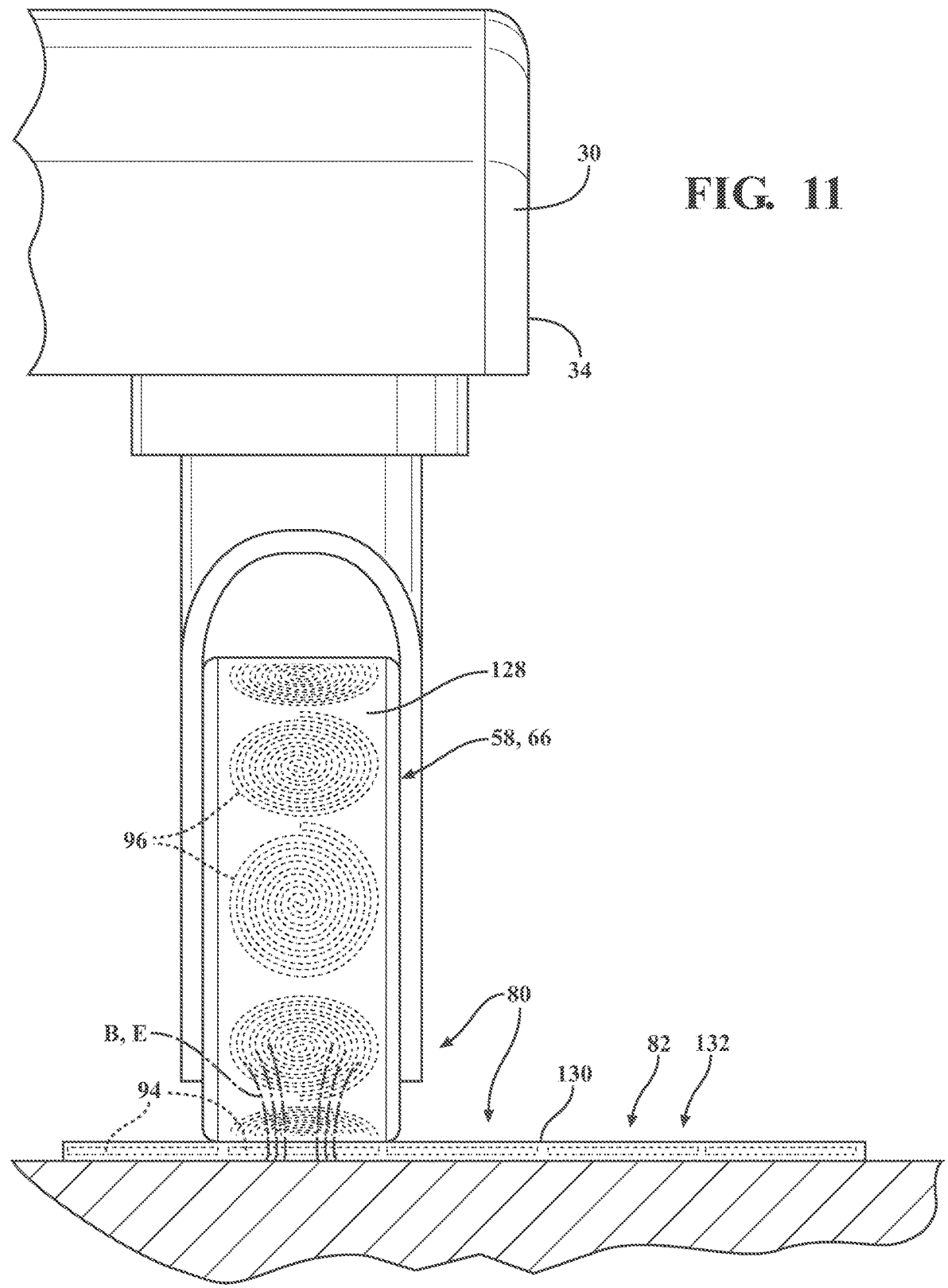
FIG. 11 is an elevation view, partially in cross-section, illustrating interaction between the electrical sending elements of the power transfer device and the electrical receiving elements of the wheel of FIG. 10.

Since the electrical receiving element 96 is aligned with the contact face 128 in this example, the power transfer device 82 can interact with the contact face 128 to establish coupling to the electrical receiving element 96. Accordingly, as shown in FIGS. 9-11, the power transfer device 82 comprises a horizontal member 130 being aligned with, or otherwise parallel to, the floor surface. The horizontal member 130 can be placed on the floor surface or integrated within the floor. The horizontal member 130 comprises one or more electrical sending elements 94, which are also aligned with the floor surface.

When the wheel 58, 66 moves over the horizontal member 130, interaction between the contact face 128 and the horizontal member 130 occurs to facilitate interaction between the electrical receiving element 96 and the electrical sending element 94 to transfer power. The electrical sending elements 94 of the horizontal member 130 may be spaced apart from one another and/or geometrically sized to correspond to the electrical receiving elements 96. The electrical sending elements 94 and the electrical receiving elements 96 may be of different sizes or of relatively the same size and may have configurations other than those shown in the Figures.

The horizontal member 130 may be configured to interact with the wheel 58, 66 when the wheel 58, 66 is moving to facilitate power transfer when the wheel 58, 66 is moving. In other examples, the horizontal member 130 interacts with the wheel 58, 66 when the wheel 58, 66 is stationary such that power transfer occurs when the wheel 58, 66 is stationary. In either scenario, the horizontal member 130 may be suitable for locations in a facility where frequent traffic for patient support apparatuses 30 occurs, such as hallways, doorways, elevators, docking locations, charging stations, and the like. The horizontal member 130 of the power transfer device 82 may be installed into a fixture of a facility. In other examples, the horizontal member 130 is coupled to a docking station for the patient support apparatus 30. The horizontal member 130 may be on a stationary or mobile unit.

In the example of FIG. 9, the power transfer device 82 comprises the guide mechanism 120 configured to mechanically receive the wheel 58, 66 during movement thereof. The wheel 58, 66 comprises electrical receiving elements 96 aligned with the contact face 128. The power transfer device 82 comprises the horizontal member 130 disposed within the guide mechanism 120, e.g., between opposing guide walls. The horizontal member 130 comprises a plurality of electrical sending elements 94 disposed along the length. The horizontal member 130 may extend along the floor surface according to any suitable length and may comprise any appropriate width to accommodate one or more wheels 58, 66 to enable power transfer to the moving wheel 58, 66.

The electrical sending elements 94 are configured to interact respectively with the electrical receiving elements 96 as the wheel 58, 66 moves over the horizontal member 130. Of course, any number of horizontal members 130 may be used instead of one. The horizontal member 130 and guide mechanism 120 may have configurations other than those shown in the figures. Furthermore, the embodiment of FIG. 9 may be combined with the embodiment of FIG. 7 to provide the guide mechanism 120 with electrical sending elements 94 in both the vertical members 112a, 112b and the horizontal member 130 to provide increased power transfer.

In FIG. 10, the horizontal member 130 is embodied as a floor mat 132, as shown. The floor mat 132 comprises an array of electrical sending elements 94 disposed in any suitable pattern. The pattern of electrical sending elements 94 may be different from that shown in FIG. 10. For example, certain electrical sending elements 94 may be encompassed by others. Furthermore, the electrical sending elements 94 may be of various sizes and/or geometries based on factors, such as anticipated interaction of the wheel 58, 66 with the floor mat 132, geometry of the wheel 58, 66, properties of the electrical sending elements 94, and the like. The floor mat 132 may be coupled to the power supply 84 to provide energy to the electrical sending elements 94. The floor mat 132 may have any suitable geometric shape, such as an elongated rectangular shape, a curved shape, or the like. The floor mat 132 may also have portions that are not aligned with the floor surface, but rather extend above the floor surface, such as along an adjacent wall, or the like. The open nature of the floor mat 132 allows easy entry and exit of the wheel 58, 66 from any direction. As such, the floor mat 132 may provide power transfer whether the wheel 58, 66 is stationary or moving.

FIG. 11 is an elevation view, partially in cross-section, illustrating an example of interaction between the electrical sending elements 94 of the floor mat 132 and the electrical receiving elements 96 of the wheel 58, 66. The contact face 128 of the wheel directly contacts the floor mat 132. Spacing between the electrical sending elements 94 of the floor mat 132 and the electrical receiving elements 96 of the wheel 58, 66 exists because of the thickness of the contact face 128 and the thickness of floor mat 132 encompassing the electrical sending elements 94. Between this spacing, power, e.g., inductive or capacitive, is wirelessly transferred between the elements 94, 96, as described. As with any other embodiment described herein, one or more electrical sending elements 94 may interact with one or more electrical receiving elements 96. Transfer of power will vary depending upon the position and orientation of the wheel 58, 66 relative to the floor mat 132.

In yet another example, the horizontal member 130 may be integrated into the power transfer device 82 such as that shown in FIG. 6. Specifically, electrical sending elements 94 may be included in the mechanical features 116, such as grooves or channels, that capture the wheel 58, 66 to establish stationary power transfer. Furthermore, when the electrical receiving elements 96 are aligned with the contact face 128 of the wheel 58, 66, the stop 114 in FIG. 6 may be equipped with one or more electrical sending elements 94 to establish power transfer to the electrical receiving elements 96 when the wheel 58, 66 is stationary.

Power may be transferred to any number of wheels 58, 66 of the patient support apparatus 30 simultaneously or individually. For example, when the patient support apparatus 30 comprises four caster assemblies 58a-58d and one or more auxiliary wheels 66, such as is shown in FIG. 1, power may be transferred simultaneously to each of the four caster assemblies 58a-58d and the one or more auxiliary wheels 66. Taking the embodiment of FIG. 10 for example, the four caster assemblies 58a-58d and the auxiliary wheel 66 may simultaneously rest upon the floor mat 132. In such situations, the caster assemblies 58a-58d would provide four points of receiving power transfer and the auxiliary wheel 66 would provide an additional fifth point of receiving power transfer. As such, with these several points of power transfer, there exists a high tolerance for alignment between the power receivers 86 and the floor mat 132.

Moreover, the auxiliary wheel 66 may be of a greater size (e.g., diameter and width) than the size of the caster assemblies 58a-58d. As such, in view of the power receiver 86 configurations described herein, the power transfer capabilities may be greater for the auxiliary wheels 66 as compared with the caster assemblies 58a-58d. When used in conjunction, such as with the floor mat 132 of FIG. 10, the caster assemblies 58a-58d may each provide a lesser amount of power transfer while the auxiliary wheel 66 provides a greater amount of power transfer. Such variability enables the patient support apparatus 30 to receive power in a balanced, dynamic fashion.

As described, electrical coupling is made to the wheel 58, 66 to energize the power receiver 86 and any components associated therewith that are integrated with the wheel 58, 66, such as the electrical receiving elements 96. It may be desirable to energize the power receiver 86 in certain scenarios and not to energize the power receiver 86 in other scenarios. Preventing activation of the power receiver 86 may be desirable to reduce electromagnetic interference with surrounding devices and/or to minimize consumption of power of the patient support apparatus 30 when not transferring power.

Figure 13:
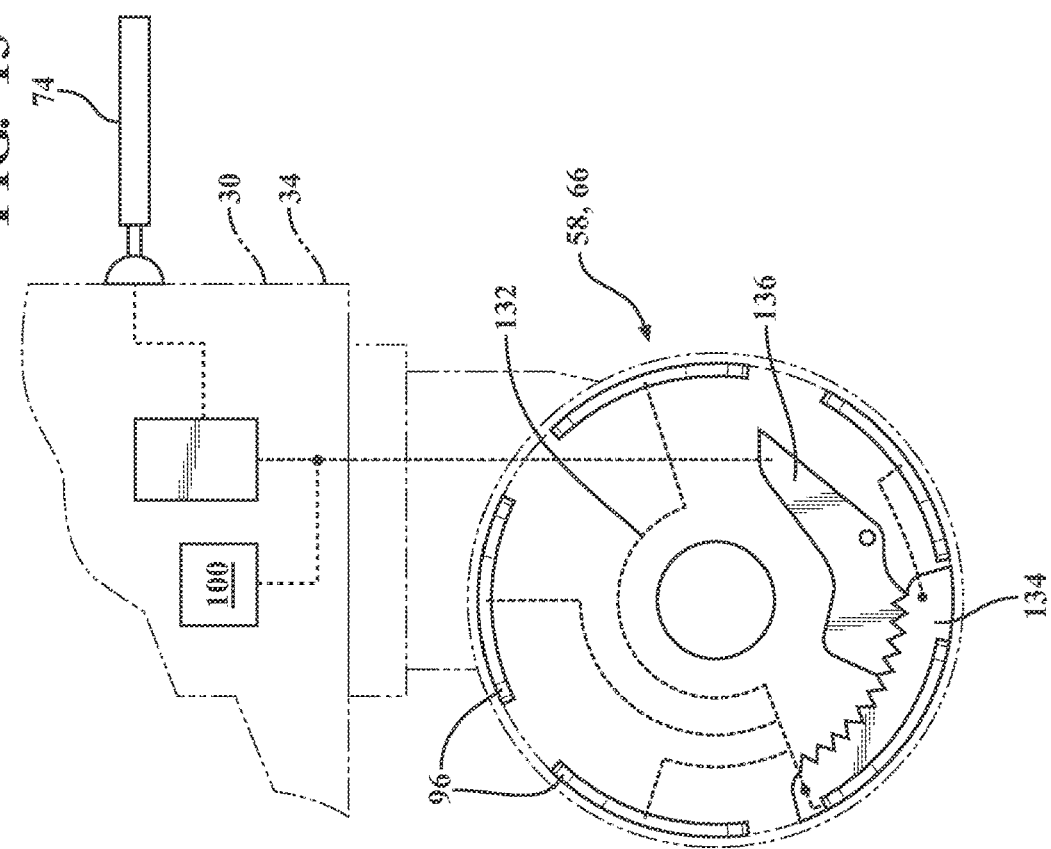
FIG. 13 is the view of FIG. 12, wherein the brake mechanism is actuated to provide electrical connection between the electrical receiving elements and the electrical system of the patient support apparatus.
Figure 12:
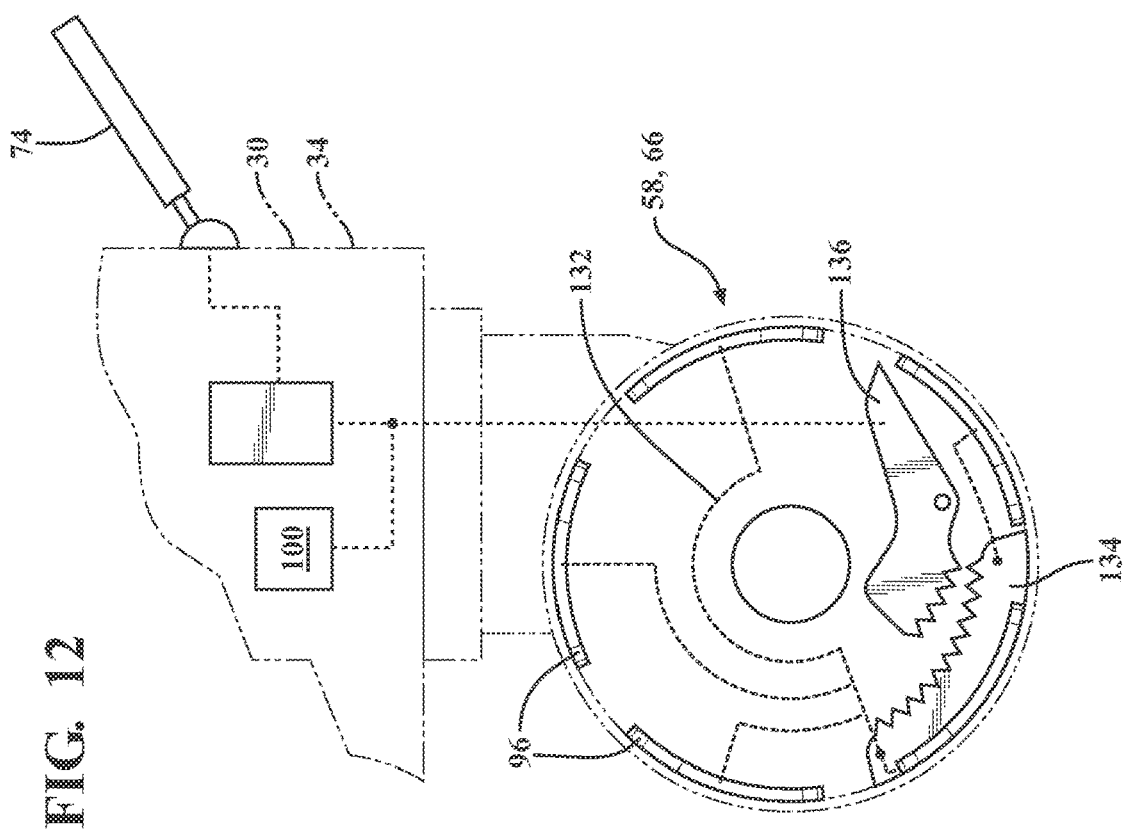
FIG. 12 is a side view, partially in phantom, of the patient support apparatus comprising electrical receiving elements integrated in the wheel and an unactuated brake mechanism providing electrical disconnection of the electrical receiving elements to an electrical system of the patient support apparatus.

Referring to FIGS. 12 and 13, one configuration is shown whereby such electrical coupling to the power receiver 86 is selectively controlled. In this example, selective coupling is triggered by actuation of the brake mechanism 74. As shown in FIG. 12, first and second braking elements 134, 136 are integrated with the wheel 58, 66. The first braking element 134 may rotate with the wheel 58, 66 while the second braking element 136 remains stationary relative to rotation of the wheel 58, 66. Alternatively, the second braking element 136 may also rotate with rotation of the wheel 58, 66. The braking elements 134, 136 are configured to engage each other mechanically to provide braking. For example, as shown, the braking elements 134, 136 comprise corresponding teeth for engagement. In FIG. 12, the second braking element 136 is disengaged from the first braking element 134. The braking elements 134, 136 may be configured to engage each other using means other than mechanical engagement, such as electromagnetic engagement, or the like.

The braking elements 134, 136 are at least partially electrically conductive to allow transfer of electrical current therethrough. The electrical receiving elements 96 of the power receiver 86 are each electrically connected to one of the braking elements 134, 136. More specifically, the electrical receiving elements 96 are coupled to the first braking element 134 in this example. The second braking element 136 is electrically connected to the power distribution system of the patient support apparatus 30, and may be connected, more specifically, to the receiver circuit 100 for the power receiver 86. Since the second braking element 136 is disengaged from the first braking element 134 when the brake mechanism 74 is not actuated in FIG. 12, there remains an open circuit such that the electrical receiving elements 96 are not energized.

In FIG. 13, the brake mechanism 74 is actuated such that the second braking element 136 engages the first braking element 134. In turn, the teeth of the braking element 134, 136 engage each other to lock the wheel 58, 66. Through this engagement, electrical contact is established between the braking elements 134, 136. As a result, the electrical receiving elements 96 can be energized through the braking elements 134, 136.

Those skilled in the art appreciate that FIGS. 12 and 13 show only one example of the braking mechanism 74 and braking elements 134, 136, and that the braking system or components thereof may be of any other suitable configuration to stop movement of the wheel 58, 66. For example, the braking elements 134 may be a brake pad and a rotor that selectively engage each other during braking, establishing electrical contact therebetween.

Furthermore, it should be appreciated that the power receiver 86 may be selectively energized using means other than the braking system for the wheel 58, 66. For example, the electrical receiving elements 96 may be directly wired through the wheel 58, 66 to the controller 68, which can selectively switch on/off any of the electrical receiving elements 96 using any suitable software or hardware control and based on sensor input.

In the embodiments of FIGS. 3-13, power is transferred to the wheel 58, 66 wirelessly using inductive and/or capacitive coupling techniques. However, wireless power transfer may occur using mechanical or electromechanical power transfer techniques.

Figure 14:
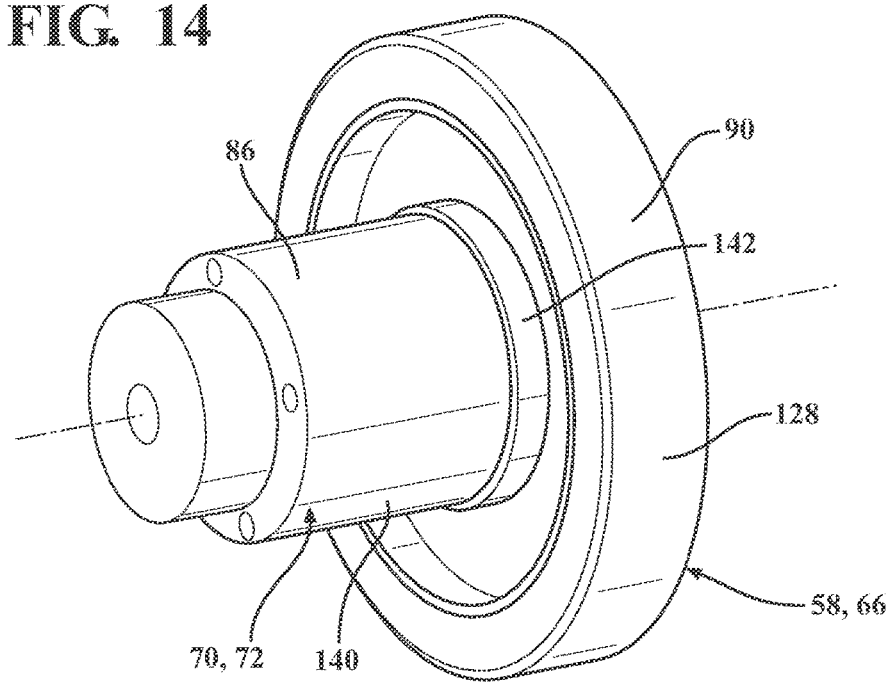
FIG. 14 is a perspective view of a wheel motor coupled to the wheel, wherein power receiver is embodied as, or integrated with, the wheel motor.

Referring to FIG. 14, one embodiment is shown wherein the power receiver 86 comprises a wheel motor 70, 72 coupled to, or otherwise integrated with the wheel 58, 66. The wheel motor 70, 72 may be the steering motor 70 and/or drive motor 72 as described above. In some examples, the wheel motor 70, 72 is dedicated solely for power transfer purposes through the wheel 58, 66.

The wheel motor 70, 72 is configured to receive power from rotation of the wheel 58, 66 to convert mechanical power into electrical power. When used in this manner, the wheel motor 70, 72 may be understood as to function as a motor-generator. The wheel motor 70, 72 may comprise a stationary component, such as a stator, and a rotational component, such as an armature or rotor, that moves in response to the mechanical power applied thereto. The wheel motor 70, 72 may be any suitable type of motor that can generate power from wheel rotation, such as a brushless or brushed motor, and the like.

When the motor 70 is the drive motor 72, the motor 72 receives power during rotation of the wheel 58, 66 about its rotational axis R. When the motor 70 is the steering motor 70, the motor 70 receives power during rotation of the wheel 58, 66 about the swivel axis of the wheel 58, 66. Wheel motors 70, 72 can also function as both dynamic and parking brakes, as well as provide regenerative braking.

Figure 15:
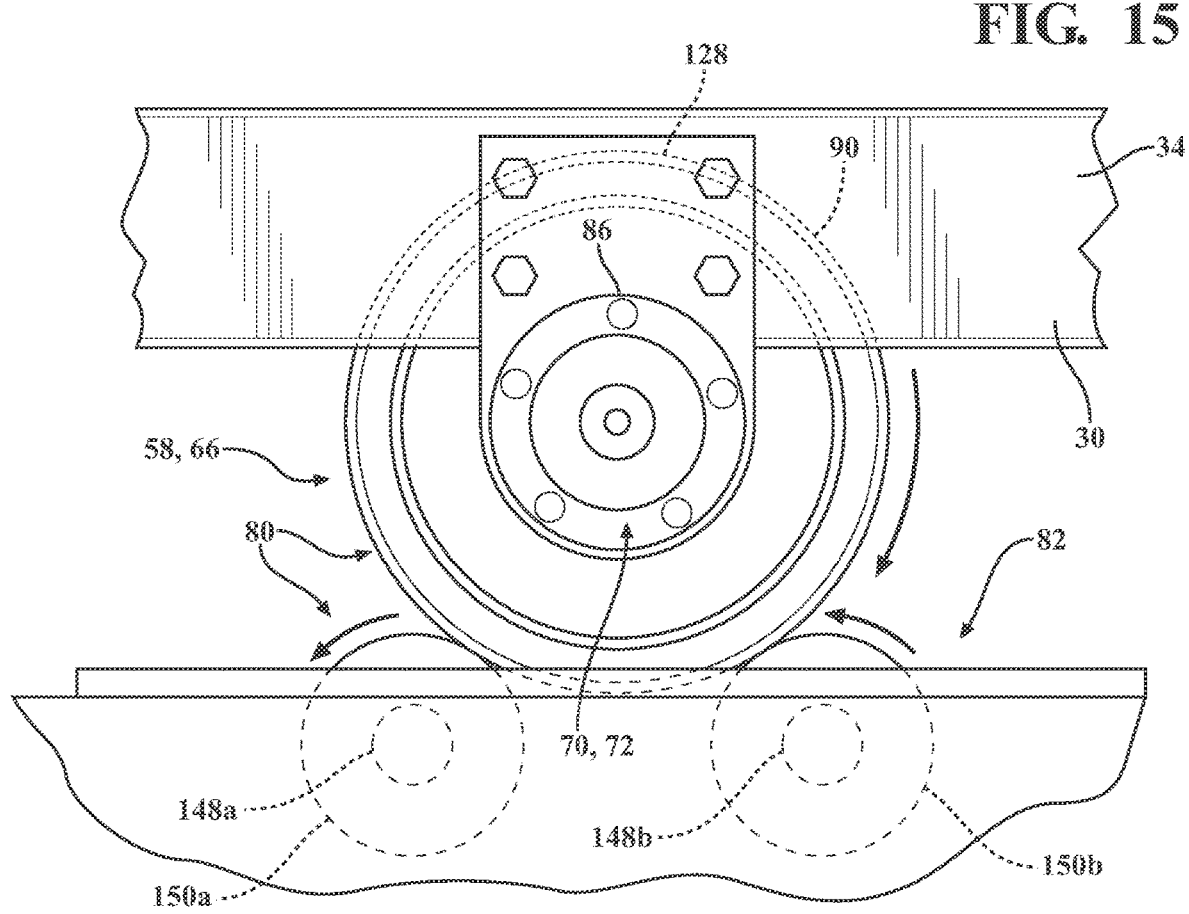
FIG. 15 is an elevation view, partially in phantom of the wheel and wheel motor of FIG. 14 coupled to the patient support apparatus and interacting with the power transfer device being embodied as a unit for rotating the wheel to transfer power to the wheel motor, according to one example.
Figure 16:
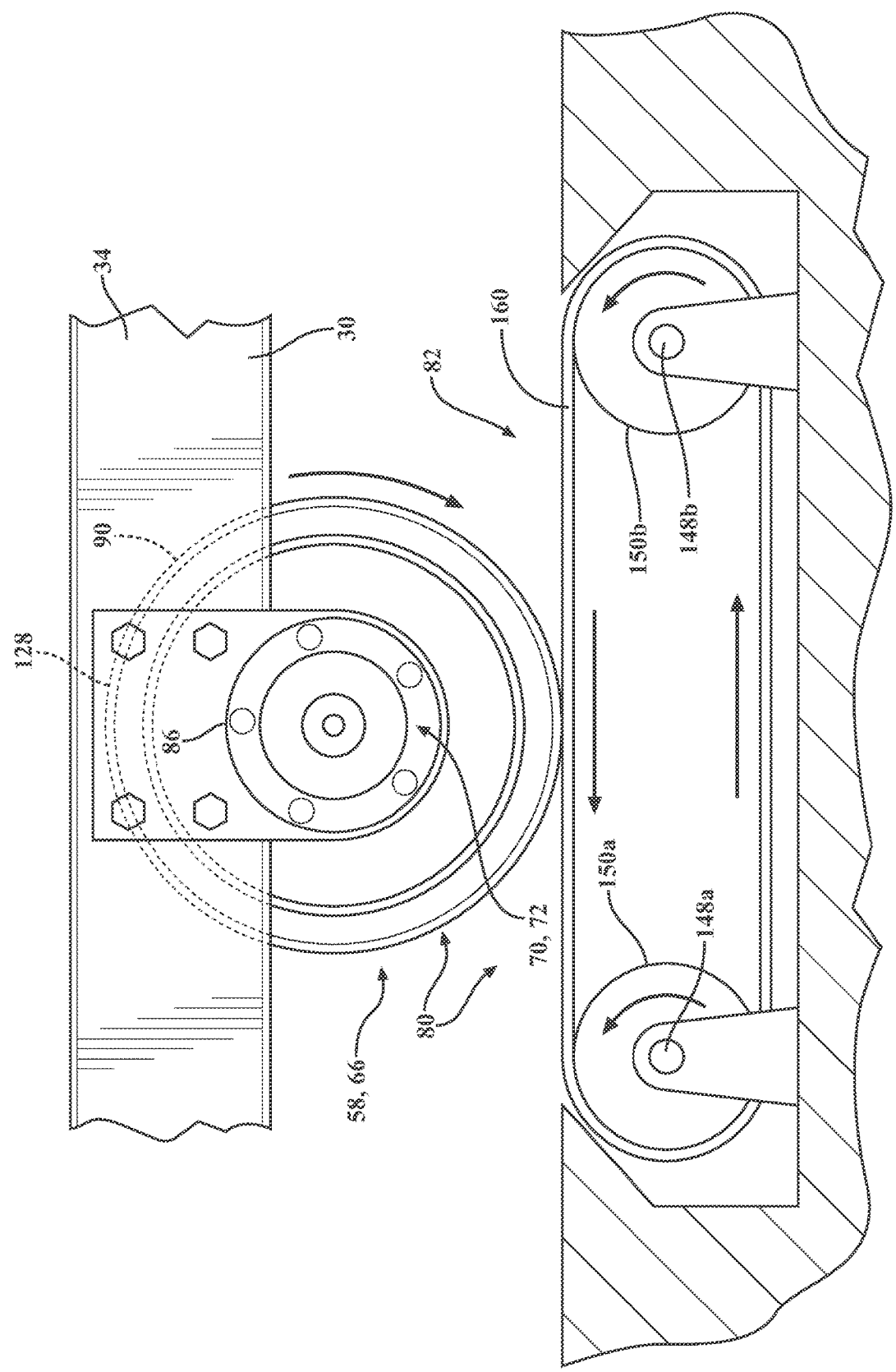
FIG. 16 is an elevation view, partially in phantom of the wheel and wheel motor of FIG. 14 interacting with the power transfer device being embodied as another example of a unit for rotating the wheel to transfer power to the motor.

In FIGS. 15 and 16, examples are shown wherein the power transfer device 82 is energizable to rotate the wheel 58, 66 for rotating the wheel motor 70, 72 to enable power transfer. More specifically, the power transfer device 82 is electrically energized to create mechanical power. The mechanical power is transferred to the wheel 58, 66, and consequently the wheel motor 70, 72, to mechanically move the same. The mechanical power that rotates the wheel 58, 66 is converted into electrical power by virtue of the electromagnetic induction, or the like, occurring with movement of the wheel motor 70, 72.

In FIGS. 15 and 16, the power transfer device 82 comprises one or more transfer motors 148a, 148b configured to move in response to electrical actuation. In the embodiments shown in FIGS. 15 and 16, the transfer motors 148a, 148b are rotational motors. The transfer motors 148a, 148b are each coupled to a mechanical transfer element 150a, 150b. The mechanical transfer elements 150a, 150b move in response to actuation of the transfer motors 148a, 148b. In the embodiments shown in FIGS. 15 and 16, the mechanical transfer elements 150a, 150b are rotational elements.

The embodiment of FIG. 15 provides the power transfer device 82 in a dyno-type configuration, wherein the mechanical transfer elements are barrels 150a, 150b. The contact face 128 of the wheel 58, 66 rests directly upon both barrels 150a, 150b. The barrels 150a, 150b rotate from actuation of the transfer motors 148a, 148b. In turn, this causes the wheel 58, 66 to rotate. Rotation of the wheel 58, 66 creates rotation of the wheel motor 70, 72, thereby enabling power generation for the patient support apparatus 30. Although the wheel 58, 66 rotates, the patient support apparatus 30 remains stationary. It should be appreciated that one barrel 150 may be utilized instead of two. Furthermore, the power transfer device 82 in this configuration may be installed into the floor or may be a unit that is placed on top of the floor surface.

The embodiment of FIG. 16 provides the power transfer device 82 in a treadmill-type configuration, wherein the mechanical transfer elements are flywheels 150a, 150b. The power transfer device 82 further comprises a contact belt 160 that is wrapped around the flywheels 150a, 150b according to a frictional fit. The contact face 128 of the wheel 58, 66 rests directly upon the contact belt 160. The flywheels 150a, 150b rotate from actuation of the transfer motors 148a, 148b. In turn, this causes the contact belt 160 to rotate about the flywheels 150a, 150b. Rotation of the contact belt 160 causes the wheel 58, 66 to rotate. Rotation of the wheel 58, 66 creates rotation of the wheel motor 70, 72, thereby enabling power generation for the patient support apparatus 30. Again, although the wheel 58, 66 rotates, the patient support apparatus 30 remains stationary. The contact belt 160 may have any suitable length and/or width to enable rotation of the wheel 58, 66.

The power transfer device 82 in FIGS. 15 and 16 may be installed into the floor or may be a unit that is placed on top of the floor surface. The power transfer device 82, transfer motor 148, and mechanical transfer element 150 may be configured to rotate the wheel 58, 66 for power transfer purposes according to embodiments other than those shown in FIGS. 15 and 16.

Any of the aforementioned embodiments of the power transfer systems 80 described herein may be utilized individually or in combination. For example, the mechanical transfer elements 150 in FIGS. 15 and 16 may further be equipped with electrical sending elements 94 for transferring power to electrical receiving elements 96 of the wheel 58, 66 simultaneously while mechanical rotation of the wheel 58, 66 enables power transfer to the motor 70, 72. Similarly, the power transfer device 82 of FIG. 6 may be equipped with mechanical transfer elements 150 in the mechanical features 116 upon which the wheel 58, 66 rests.

It will be further appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient support apparatus for interacting with an energizable power transfer device, the patient support apparatus comprising:
    a support structure having a base and a patient support surface for a patient;
    an energy storage device operatively attached to the support structure;
    a caster assembly coupled to the base, the caster assembly including a wheel to facilitate movement of the patient support apparatus over a floor surface relative to the power transfer device; and
    a power receiver arranged adjacent to the wheel of the caster assembly and disposed in electrical communication with the energy storage device, the power receiver being configured to interact with the power transfer device to facilitate power transfer from the energized power transfer device to the power receiver through the wheel to provide transferred power to the energy storage device.

2. The patient support apparatus of claim 1, wherein the caster assembly further includes a stem operatively attached to the base.

3. The patient support apparatus of claim 2, wherein power receiver is integrated into the stem of the caster assembly.

4. The patient support apparatus of claim 1, wherein the power receiver comprises a receiving coil to facilitate wireless and inductive power transfer between the receiving coil and the power transfer device.

5. The patient support apparatus of claim 1, wherein the power receiver comprises a receiving electrode to facilitate wireless and capacitive power transfer between the receiving electrode and the power transfer device.

6. The patient support apparatus of claim 1, wherein the wheel comprises one or more of a tire, a rim, an axle, and a motor, and wherein the power receiver comprises an electrical element integrated with one or more of the tire, rim, axle, and motor of the wheel.

7. The patient support apparatus of claim 1, wherein the wheel is configured to rotate about an axis of rotation and wherein the power receiver comprises one or more electrical elements integrated with the wheel and disposed radially about the axis of rotation.

8. The patient support apparatus of claim 1, wherein the wheel comprises a contact face for interacting with the floor surface and wherein the power receiver comprises an electrical element integrated with the wheel and aligned with the contact face of the wheel.

9. The patient support apparatus of claim 1, wherein the wheel comprises an exterior face that is perpendicular to the floor surface and wherein the power receiver comprises an electrical element integrated with the wheel and aligned with the exterior face of the wheel.

10. The patient support apparatus of claim 1, wherein the power receiver comprises a wheel motor configured to receive power from rotation of the wheel effected by movement of at least a portion of the power transfer device.

11. The patient support apparatus of claim 1, wherein the power receiver is configured to facilitate power transfer from the energized power transfer device to the energy storage device when the wheel is stationary.

12. The patient support apparatus of claim 1, wherein the power receiver is configured to facilitate power transfer from the energized power transfer device to the energy storage device when the wheel is moving.

13. The patient support apparatus of claim 1, wherein the patient support apparatus comprises four caster assemblies supporting respective wheels, and four power receivers arranged adjacent to the respective wheels.

14. The patient support apparatus of claim 1, wherein the patient support apparatus further comprises a brake mechanism and a power supply and wherein the power receiver comprises one or more electrical elements and further comprising a device coupled between the power supply and the electrical element and wherein the device is actuated to establish electrical coupling between the power supply and the electrical element when the brake mechanism is actuated and wherein the device is actuated to prevent electrical coupling between the power supply and the electrical element when the brake mechanism is not actuated.

* * * * *